United States Patent
Underhill et al.

(10) Patent No.: US 7,688,674 B2
(45) Date of Patent: Mar. 30, 2010

(54) METHODS AND APPARATUS FOR PERFORMING MOVING CHECKSHOTS

(75) Inventors: William Underhill, Richmond, TX (US); Masahiro Kamata, Kanagawa-Ken (JP); Jiro Takeda, Tokyo (JP); Colin Wilson, Kanagawa-Ken (JP)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 11/681,788

(22) Filed: Mar. 5, 2007

(65) Prior Publication Data

US 2008/0219096 A1 Sep. 11, 2008

(51) Int. Cl.
*G01V 1/40* (2006.01)

(52) U.S. Cl. .......................................... 367/25; 367/57

(58) Field of Classification Search ................... 367/27, 367/86, 25, 35, 56, 57; 702/18
See application file for complete search history.

(56) References Cited

U.S. PATENT DOCUMENTS

| | | | | |
|---|---|---|---|---|
| 3,001,396 | A * | 9/1961 | Cleveland | 73/152.54 |
| 4,534,019 | A * | 8/1985 | Wiggins et al. | 367/75 |
| 4,789,968 | A * | 12/1988 | Rice | 367/20 |
| 4,802,146 | A * | 1/1989 | Moeckel | 367/52 |
| 5,555,220 | A * | 9/1996 | Minto | 367/86 |
| 5,585,556 | A * | 12/1996 | Petersen et al. | 73/152.03 |
| 5,589,825 | A * | 12/1996 | Pomerleau | 340/854.9 |
| 6,002,642 | A * | 12/1999 | Krebs | 367/73 |
| 6,216,789 | B1 * | 4/2001 | Lorsignol et al. | 166/355 |
| 6,253,157 | B1 * | 6/2001 | Krebs | 702/18 |
| 6,381,544 | B1 * | 4/2002 | Sallas et al. | 702/17 |
| 6,438,070 | B1 * | 8/2002 | Birchak et al. | 367/83 |
| 6,591,193 | B2 * | 7/2003 | Krebs et al. | 702/1 |
| 6,714,480 | B2 * | 3/2004 | Sinha et al. | 367/31 |
| 6,990,045 | B2 * | 1/2006 | Jackson | 367/81 |
| 7,274,990 | B2 * | 9/2007 | Mathiszik et al. | 702/6 |
| 2002/0042678 | A1 * | 4/2002 | Bevc et al. | 702/18 |
| 2003/0026167 | A1 * | 2/2003 | Hahn et al. | 367/38 |
| 2003/0179651 | A1 * | 9/2003 | Nutt et al. | 367/25 |
| 2004/0243313 | A1 * | 12/2004 | Broto | 702/18 |
| 2005/0052949 | A1 * | 3/2005 | Gaston et al. | 367/57 |
| 2005/0068850 | A1 * | 3/2005 | Muyzert et al. | 367/38 |
| 2005/0279532 | A1 * | 12/2005 | Ballantyne et al. | 175/40 |
| 2006/0042352 | A1 * | 3/2006 | Kamata | 73/1.85 |
| 2006/0229816 | A1 * | 10/2006 | Stinson et al. | 702/18 |
| 2007/0153628 | A1 * | 7/2007 | Mathiszik et al. | 367/57 |
| 2007/0195643 | A1 * | 8/2007 | Bakulin et al. | 367/38 |

OTHER PUBLICATIONS

Halliburton. Our Borehole Seismic Services Bridge the Gap Between Surfacea Seismic and the Wellbore. Sep. 2006. pp. 1-8.*

* cited by examiner

*Primary Examiner*—Scott A Hughes
(74) *Attorney, Agent, or Firm*—Matthias Abrell; Jaime Castano; Dale Gaudier

(57) ABSTRACT

Methods and apparatus for creating a velocity profile of a formation surrounding a borehole by checkshot measurements while moving the tool along the borehole. A conveyance and a sensor section are configured to move the sensor section in the borehole. At least one receiver is configured to detect signals generated at or near the surface while the sensor section is moving in the borehole.

50 Claims, 25 Drawing Sheets

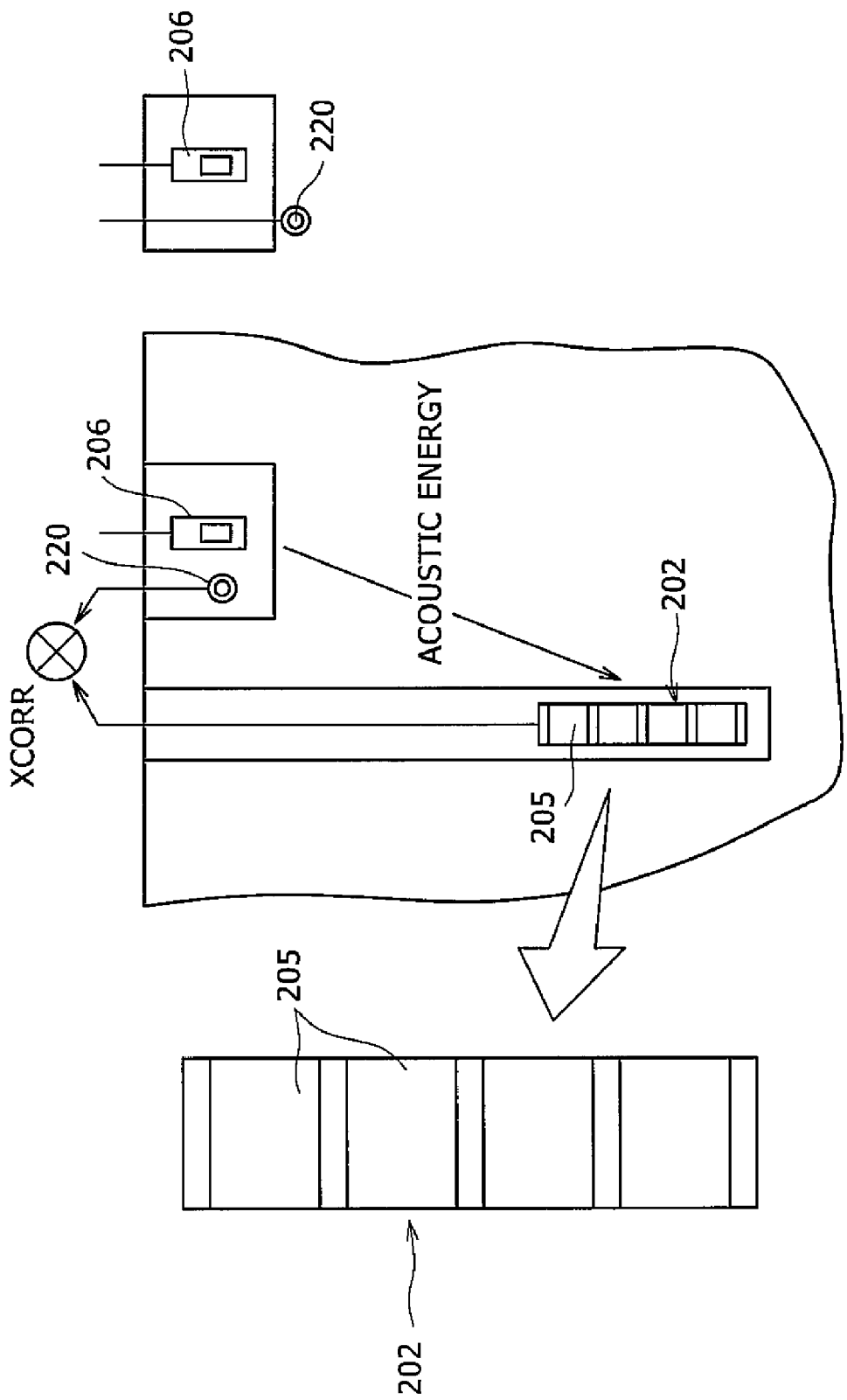

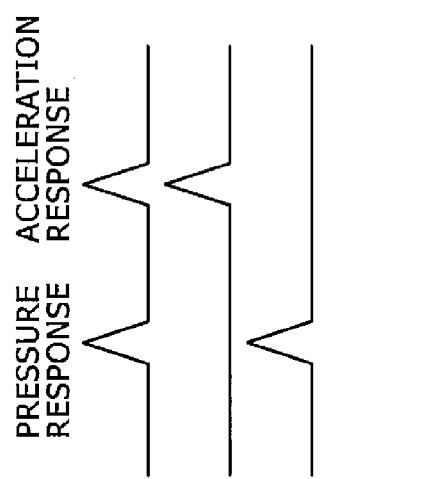
FIG. 4C
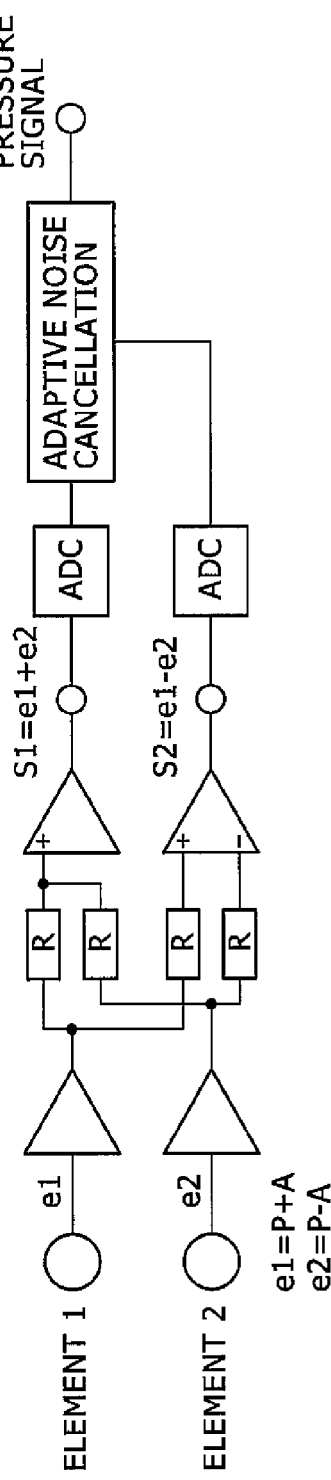
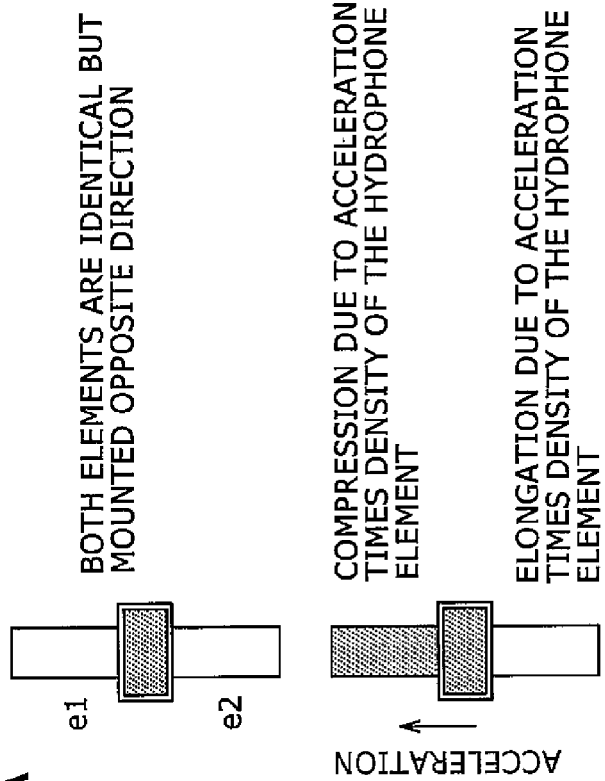
FIG. 4A
FIG. 4B

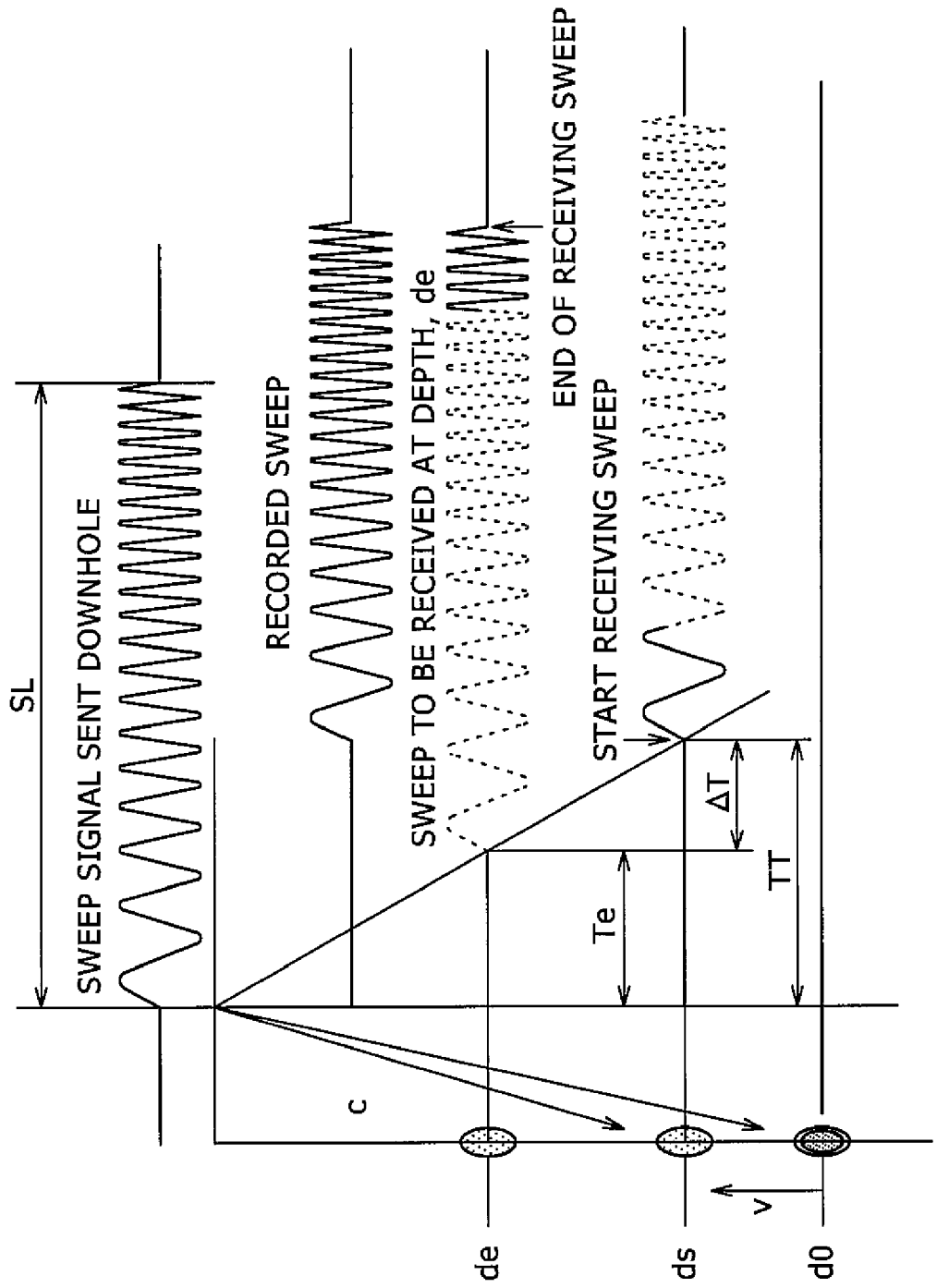

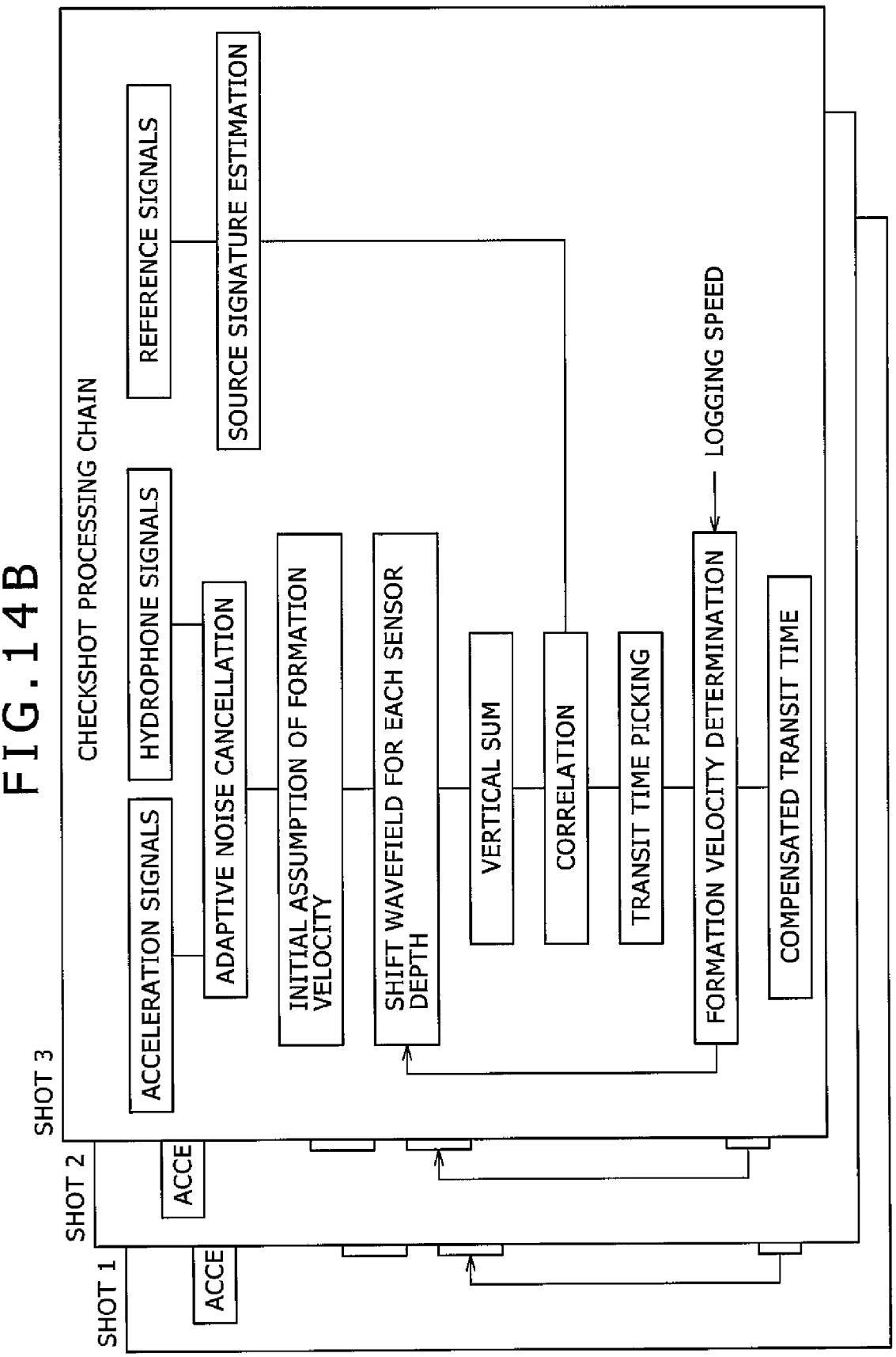

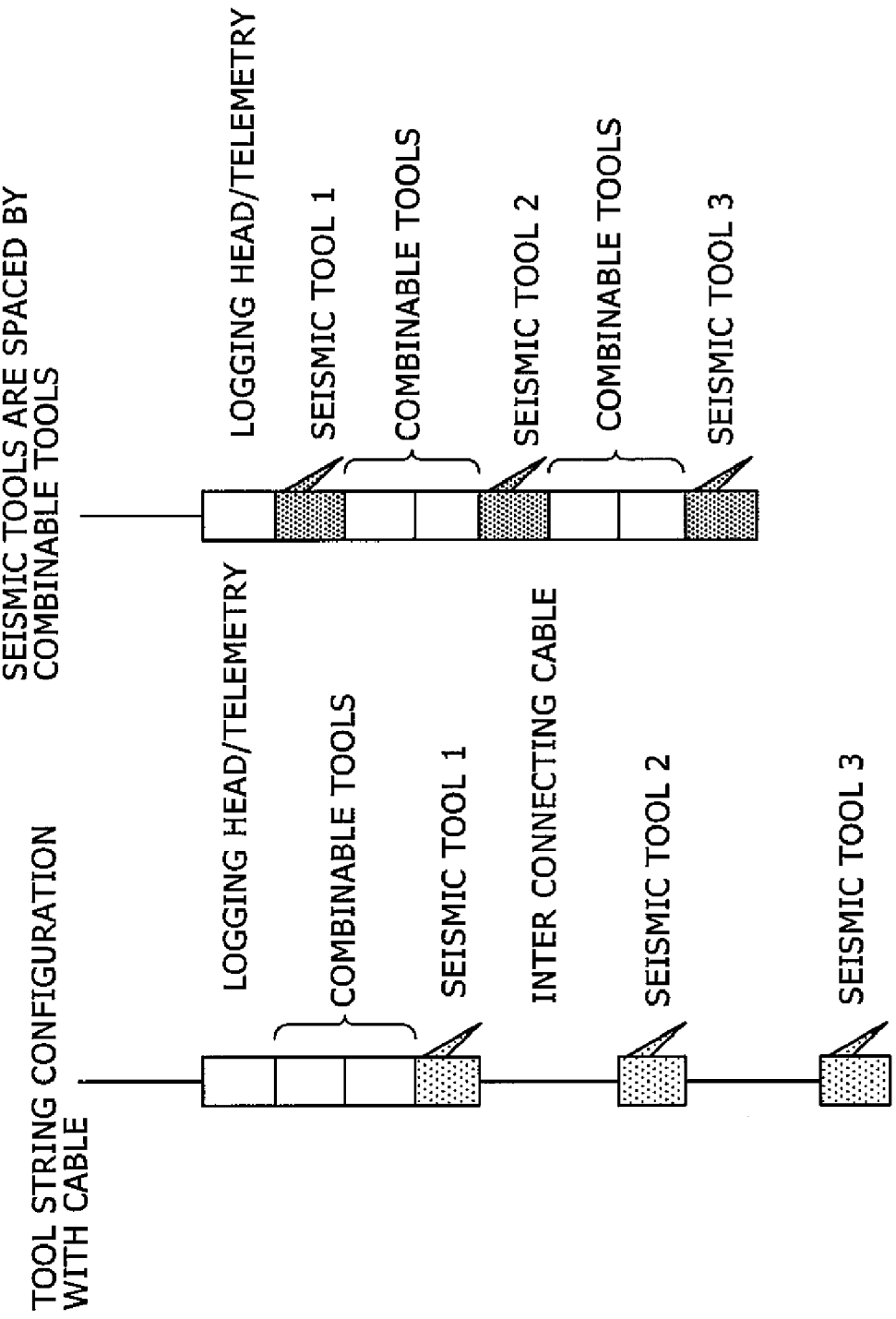

METHODS AND APPARATUS FOR PERFORMING MOVING CHECKSHOTS

FIELD

The present disclosure relates generally to methods and apparatus for performing checkshots. More specifically, some aspects disclosed herein are directed to methods and systems for acquiring checkshot data with a tool moving in a borehole for the creation of a velocity profile of a formation surrounding a borehole.

BACKGROUND

Seismic exploration can provide valuable information useful in the drilling and operation of oil and gas wells. In seismic exploration, energy is introduced by a seismic source on the earth's surface to create a seismic signal that is propagated throughout the subterranean formation. This seismic signal is reflected to differing degrees by features that are of interest. A receiver on the surface monitors these reflected signals to help generate a seismic map of the underground features. This map is generated by knowing the exact time that a seismic signal was activated as compared to the time that the reflected signal is received. As a practical matter, the system comprises a plurality of sources and receivers to provide the most comprehensive map possible of subterranean features. Different configurations may yield two dimensional or three dimensional results depending on their mode of operation.

While these calculations may seem simple at first glance, difficulty arises from the fact that the seismic signals will travel at different velocities depending on the makeup of the formation. This leads to an image of the reflecting feature that is unfocused and provides a depth that is likely to be inaccurate.

In order to correct for this inaccuracy, it is necessary to create a velocity profile of the formation surrounding a borehole so that the expected velocities can be used in determining the depth and size of the underground feature of interest. This can be achieved using a "checkshot" which typically involves a seismic source on or near the surface and a receiver placed at a known distance in the already drilled borehole, although "reverse checkshots" are also known in the art. The source then generates a seismic signal and the receiver records the time at which it reaches that point in the borehole. Since all distances are known, the velocity of the signal's travel through the borehole can be calculated.

This checkshot and velocity calculation must be performed at a plurality of depths in the borehole and using one or more sources at the same location or spaced at varying distances from the borehole. Conventional systems require that the receiver in the borehole be stopped and anchored for each checkshot measurement. This greatly increases the time and cost required in creating a velocity profile. The reason for this is the fact that the electronics and sensors used in receiving the seismic signals are too sensitive to any noise from contact, such as abrasion, with the borehole wall, and from the motion of the receiver. Additionally, due to the same considerations, the receiver generally has to be introduced into the borehole on its own with only its associated electronics.

SUMMARY

The disclosure herein may meet at least some of the above-described needs and others. In consequence of the background discussed above, and other factors that are known in the field of formation analysis, applicants recognized need for apparatus and methods for collecting checkshot data while a tool is in motion through a borehole to provide faster and more numerous collection of data points. In this, applicants recognized that an apparatus was needed that could monitor seismic signals generated on or near the surface, while effectively measuring and canceling noise due to movement of the apparatus through the borehole and contact with the borehole wall. Additionally, applicants recognized that the ability to integrate this tool into an integrated data collection device, for example, a sonic tool and/or a tool for collecting and analyzing downhole fluids, would allow for a single testing run rather than multiple runs to collect the same data. Applicants also recognized that a tool capable of addressing the needs described herein would also be suitable for taking the same or similar measurements in a horizontal borehole.

In one aspect, methods and apparatus are provided for taking checkshot measurements in the borehole while the tool is in motion. In some aspects herein, at least one acceleration canceling hydrophone may be utilized along with a plurality of accelerometers and/or geophones. In one embodiment herein, the information gathered from the components downhole is conveyed along a conveyance to a surface analysis device. In other aspects, noise cancellation algorithms and other calculations may be performed to determine the velocity profile for each checkshot.

Aspects disclosed herein provide a system configured for acquiring checkshot seismic data while moving a tool in a borehole. In certain embodiments, the system comprises a source configured at a location separated away from the tool for generating seismic signals; and a conveyance and a sensor section configured for movement of the sensor section in a borehole; the sensor section comprising at least one receiver configured to detect seismic signals, generated by the source, while the sensor section is moving in the borehole. In some aspects herein, the at least one receiver may comprise one or more hydrophone. In some embodiments, the one or more hydrophone may comprise one or more acceleration canceling hydrophone. In some aspects, the system may comprise a plurality of accelerometers and/or geophones configured to detect noise during the movement of the sensor section. In other aspects, the system may further comprise a reference sensor associated with the source and configured for acquiring a reference signal generated by the source.

In yet other aspects herein, the system may be configured for cross-correlation of the signals detected by the at least one receiver, based on the reference signal, to reduce noise generated by movement of the sensor section in the borehole. The at least one receiver may comprise a plurality of hydrophones arranged circumferentially in at least one row on an outer surface of a housing of the sensor section, and the system may be further configured for random noise reduction based on seismic signals detected by the plurality of hydrophones. The system may comprise a processor configured for random noise reduction and the processor may comprise instructions for segmenting and digitizing separately the seismic signals detected by the plurality of hydrophones, and shift/summing the seismic signals. The system may comprise at least one accelerometer located adjacent an inner side of the circumferentially arranged hydrophones on the housing of the sensor section.

The system may comprise a processor configured for noise reduction, wherein the processor comprises instructions for compensating the signals detected by the at least one receiver for tool movement. In aspects herein, the processor may comprise instructions for correction for a Doppler effect. The source may comprise an impulsive source. The source may comprise a vibrator. The source may comprise an electromagnetic transmitter, and the system may be configured for detecting electromagnetic signals. In aspects herein the system may be configured for continuous checkshot data acquisition and processing.

In certain embodiments, the system may comprise a controller section operably connected to the sensor section and configured to adjust data acquisition parameters; a clock operably connected to the controller section; a communications interface operably connected to the controller and the conveyance and configured to communicate data along the conveyance; and a surface processing unit operably connected to the conveyance, wherein the at least one receiver is configured to transmit electrical signals through the controller section, the communications interface, and the conveyance to the surface processing unit, and the surface processing unit is configured to perform signal processing and to generate a velocity profile using the electrical signals from the at least one receiver. In certain aspects, the conveyance may be configured to move the sensor section through the borehole at a constant rate. In other aspects herein, the conveyance may be configured to temporarily stop the sensor section during movement through the borehole; the sensor section being configured to detect signals while stopped in the borehole; and the system may comprise a processor having instructions for noise removal based on the detected signals while stopped.

In some embodiments, the at least one receiver may be configured to detect signals generated by the source at ground level. In other embodiments, the at least one receiver may be configured to detect signals generated by the source below ground level. The source may comprise an air gun. The source may comprise an electromagnetic transmitter and the system may be configured for receiving/detecting electromagnetic signals. The source may comprise a dropped weight. The source may comprise a vibrator.

In aspects disclosed herein, the system may comprise two or more acceleration canceling hydrophones configured to detect pressure gradient across the hydrophones; a processor comprising instructions for signal direction estimation based on the pressure gradient detected by the hydrophones. The system may comprise one or more 3-component and/or tetrahedron geophone for signal direction estimation. The system may comprise a processor having signal processing instructions comprising adaptive noise cancellation algorithm. The system may comprise a stabilizing structure configured for reducing shock from contact between the sensor section and the borehole wall. One or more acoustic isolators may be located adjacent to the at least one receiver and configured to reduce propagation of noise to the receiver. The sensor section may be contoured to reduce shock from contact with the borehole wall. A controller may be configured to control the at least one receiver to detect data only when other devices are not transmitting interfering noise. The controller may be configured to synchronize firing of the source and signal detection of the at least one receiver. The controller may be configured to control firing of the source based on the location in the borehole of the sensor section. The controller may be configured to control the source such that signals are generated at intervals of depth of the sensor section. The controller may be configured to control the source such that signals are generated at 10 feet intervals while the sensor section moves through the borehole.

Other aspects herein provide an apparatus for acquiring checkshot data while moving a tool in a borehole, comprising a sensor section configured for movement in a borehole; the sensor section comprising at least one receiver configured to detect signals while the sensor section is moving in the borehole. Yet other aspects disclosed herein provide a method for acquiring checkshot data while moving a tool in a borehole, comprising configuring a source at a location away from the tool for generating signals; deploying a conveyance and a sensor section configured for movement of the sensor section in a borehole; detecting signals, generated by the source, with at least one receiver while the sensor section is moving in the borehole.

Additional advantages and novel features will be set forth in the description which follows or may be learned by those skilled in the art through reading the materials herein or practicing the principles described herein. Some of the advantages described herein may be achieved through the means recited in the attached claims.

BRIEF DESCRIPTION OF THE DRAWINGS

The accompanying drawings illustrate certain embodiments and are a part of the specification. Together with the following description, the drawings demonstrate and explain some of the principles of the present invention.

FIG. 2B is a schematic view of another possible context utilizing cross-correlation of detected signals.

FIGS. 4A-4C depict some possible techniques for acceleration cancellation according to the principles herein.

FIGS. 10A and 10B are schematic depictions of the Doppler effect for moving checkshots when utilizing an impulsive source (FIG. 10A) and a vibrator (FIG. 10B).

FIGS. 14A and 14B depict exemplary techniques for continuous moving checkshots according to the principles herein.

FIG. 16 is a schematic representation of embodiments of exemplary systems for moving checkshots with integrated tools according to the principles described herein.

Figure 1:
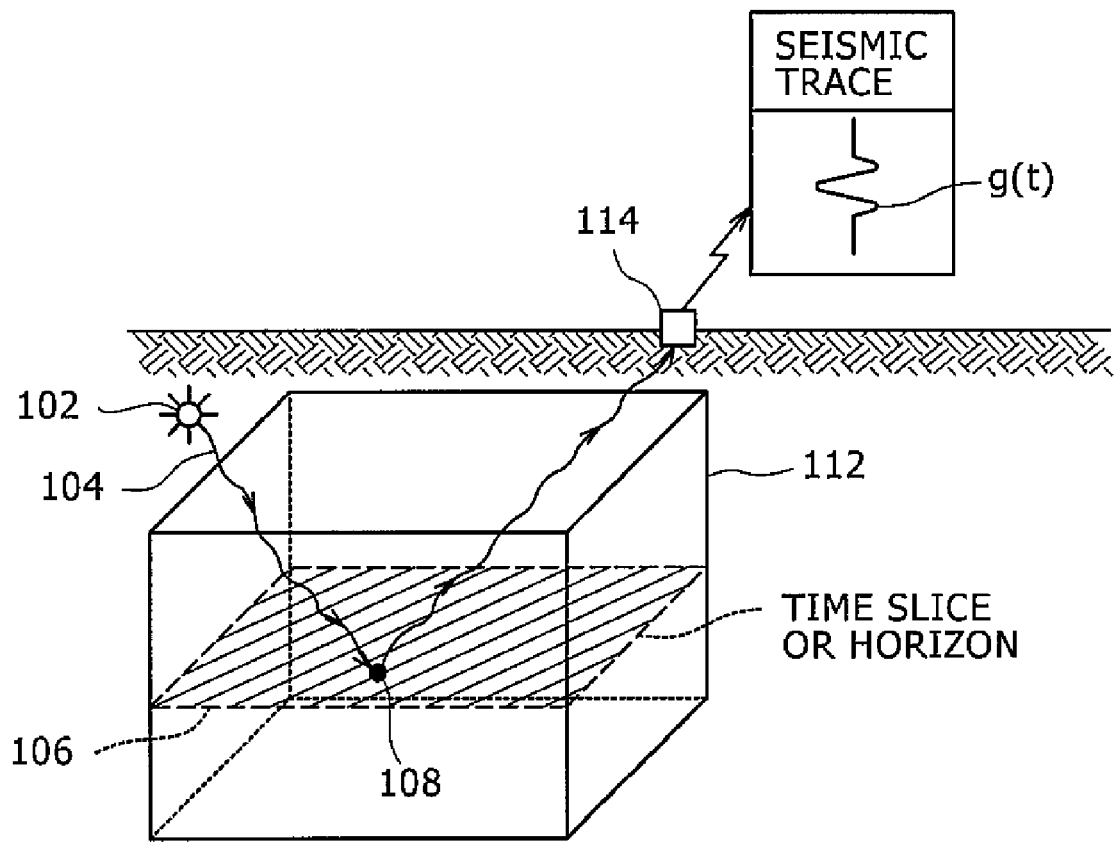
FIG. 1 is a schematic view of one method used in performing a seismic survey.

Throughout the drawings, identical reference numbers and descriptions indicate similar, but not necessarily identical elements. While the principles described herein are susceptible to various modifications and alternative forms, specific embodiments have been shown by way of example in the drawings and will be described in detail herein. However, it should be understood that the invention is not intended to be limited to the particular forms disclosed. Rather, the invention includes all modifications, equivalents and alternatives falling within the scope of the appended claims.

DETAILED DESCRIPTION

Illustrative embodiments and aspects of the invention are described below. It will of course be appreciated that in the development of any such actual embodiment, numerous implementation-specific decisions must be made to achieve the developers' specific goals, such as compliance with system-related and business-related constraints, that will vary from one implementation to another. Moreover, it will be appreciated that such development effort might be complex and time-consuming, but would nevertheless be a routine undertaking for those of ordinary skill in the art having the benefit of this disclosure.

Reference throughout the specification to "one embodiment," "an embodiment," "some embodiments," "one aspect," "an aspect," or "some aspects" means that a particular feature, structure, method, or characteristic described in connection with the embodiment or aspect is included in at least one embodiment of the present invention. Thus, the appearance of the phrases "in one embodiment" or "in an embodiment" or "in some embodiments" in various places throughout the specification are not necessarily all referring to the same embodiment. Furthermore, the particular features, structures, methods, or characteristics may be combined in any suitable manner in one or more embodiments. The words "including" and "having" shall have the same meaning as the word "comprising."

Moreover, inventive aspects lie in less than all features of a single disclosed embodiment. Thus, the claims following the Detailed Description are hereby expressly incorporated into this Detailed Description, with each claim standing on its own as a separate embodiment of this invention.

Referring to FIG. 1, as mentioned above it is desirable to use seismic information to develop maps or images of underground features using a seismic source 102 generating a seismic signal 104. Source 102 can be any of a plurality of source types including, but not limited to, an air gun, a vibrator, a dropped weight, an electromagnetic source, among others that are known to persons of skill in the art for the purposes described herein. In this, although aspects herein have generally been described in relation to seismic signals, it is contemplated that other suitable sources of energy, such as electromagnetic transmitters, also may be used with suitable modifications that are known to those skilled in the art.

The signal 104 propagates throughout the formation 112 to point 108 which is part of plane 106 that comprises a feature of interest. While part of signal 104 generally continues to propagate through the point 108, some of the energy will be reflected back towards the surface and a receiver 114. This receiver in one embodiment may be a geophone with a high sensitivity to seismic signals. As used herein, the terms "receiver" and "sensor" include any suitable device that is configured for detection of source signals and associated noise for the purposes described herein. The terms "hydrophones" and "geophones/accelerometers" include optical or MEMS devices suitable for detection of source signals and associated noise according to the principles described herein. A clock measures the time of generation of the seismic signal 104 and the time of receipt of the reflected signal at receiver 114. Using this time, it is possible to calculate the depth of the feature of interest. As mentioned above, however, the velocity of the signals through the formation may vary depending on the location, and without an accurate velocity profile, it is impossible to create a reliable image of underground features surrounding the borehole.

Figure 2A:
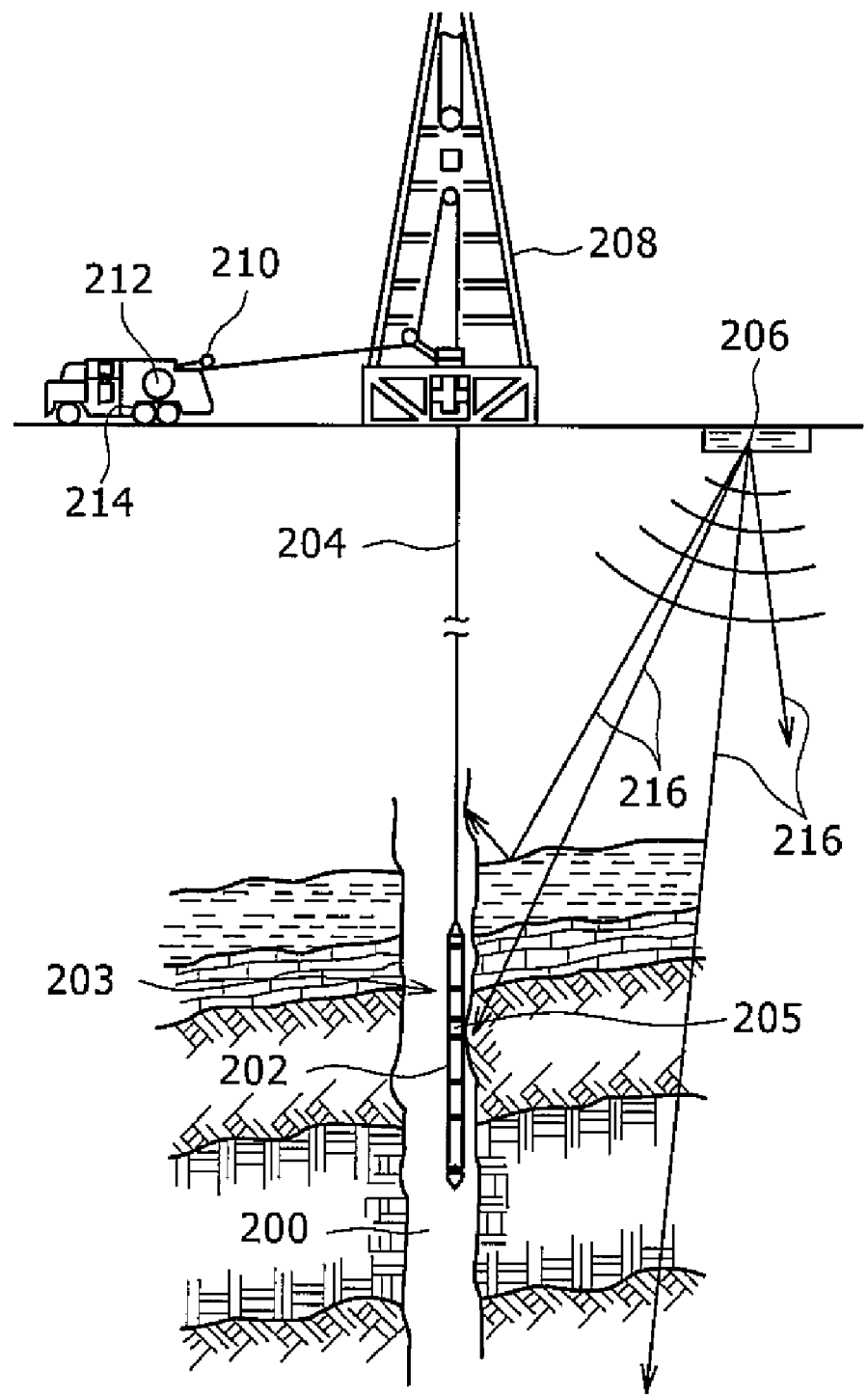
FIG. 2A is a schematic view of one possible context for some embodiments of the instant disclosure.

As noted above, it is necessary to take checkshot measurements at a variety of depths in the borehole. FIG. 2A shows one possible configuration that may be used in the collection of checkshot measurements throughout the borehole according to the principles described herein. The present disclosure contemplates application of the principles herein to various areas, such as wireline, logging-while-drilling, permanent monitoring, hydro-fracture monitoring, production logging, among others. In FIG. 2A, borehole 200 may be a previously drilled well or a borehole that is being drilled. A seismic source 206 is used to generate a seismic signal 216. The source 206 may be any type of suitable instrumentation for generating the desired signals. The generated signals 216 propagate through the formation, and some signals reach the borehole and a sensor section 202 of the tool 203 having one or more receiving device 205 for detecting the seismic signals. The sensor section 202 and the associated receiving devices 205 may be used as the primary apparatus for collecting the checkshot measurements, as described in greater detail below. One or more clocks are used to measure the exact time that the seismic source 206 generates signals 216 and when the signals are detected at the one or more receiving device 205. Because the depth of the tool 203 and the sensor section 202 is known and the distance of source 206 is also known, it is possible to calculate a velocity profile for the portion of the formation that is traversed by signals 216.

In one embodiment, the information collected by the sensor section 202 may be transmitted uphole via a suitable cable 204, for example, a wireline, slickline, or other conveyance that is configured for data telemetry, to an analysis module 214 on the surface of the borehole. The analysis module 214 may be a stand alone, or may be integrated into a field vehicle as shown in one example of FIG. 2. Alternatively, or in combination, some processing or analysis of the acquired data may be conducted downhole, and processed data may be sent uphole by suitable data telemetry apparatus for farther processing or other purposes as desirable or necessary.

As mentioned above, conventional checkshot measurements require that the sensor section be stopped and clamped in the borehole. Also, in conventional systems the checkshot data acquisition system is operated separately from any other downhole tools. According to the principles described herein, the sensor section 202 is moved through the borehole 200 by winch 210, via a suitable arrangement in the drilling tower 208, while seismic signals are detected by receiving devices 205. A device 212 may be used to record the depth of the sensor section so it is known when a measurement is taken. In one embodiment, the sensor section 202 may be lowered to a predetermined depth in the borehole 200 and then the winch 210 pulls the conveyance 204, and thus the sensor section 202, up through the borehole 200. In this, data may be acquired by the sensor section while the receiver is moving up or down in the borehole. For example, in certain aspects herein the sensor section may be moved at a constant rate of up to about 3600 ft/hr (1097 meters/hr). In other aspects disclosed herein, for example, when checkshot measurements are acquired contemporaneously with a sonic logging run, the sensor section may be moved at a speed from about 1200 to about 1800 ft/hr (366-548 meters/hr). For example, if the seismic source is fired every 10 seconds, then measurements would be taken approximately every 10 ft (3 meters), leading to a much higher resolution than conventional systems in which the need to stop and anchor the sensor section leads to much longer distances between measurements.

Figure 2C:
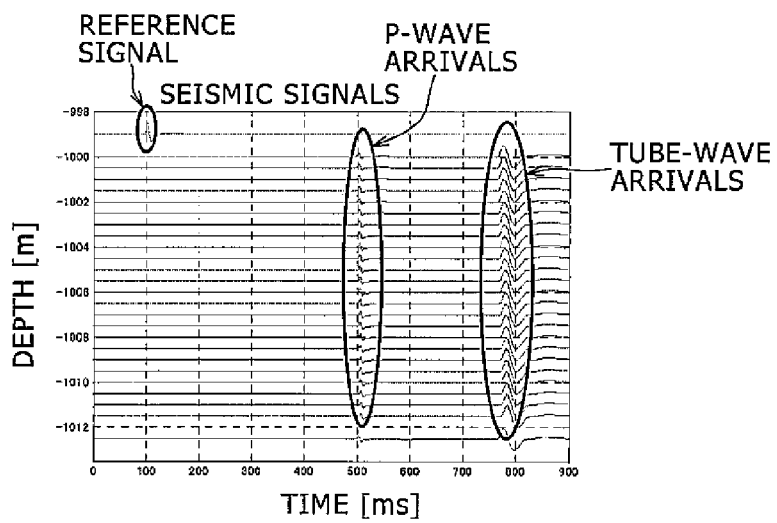
FIG. 2C depicts some possible techniques for noise cancellation according to the principles disclosed herein.
Figure 2C:
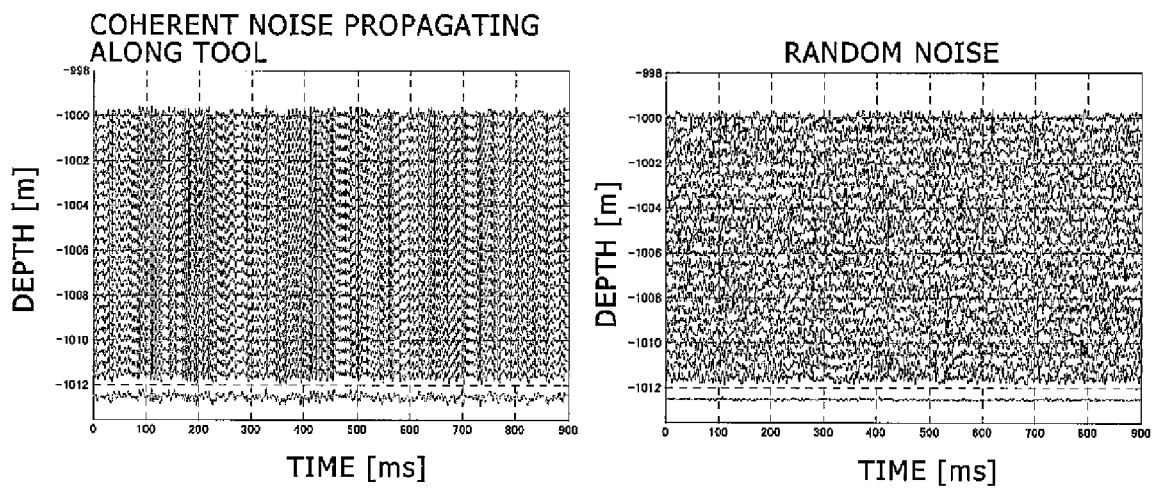
Figure 2C:
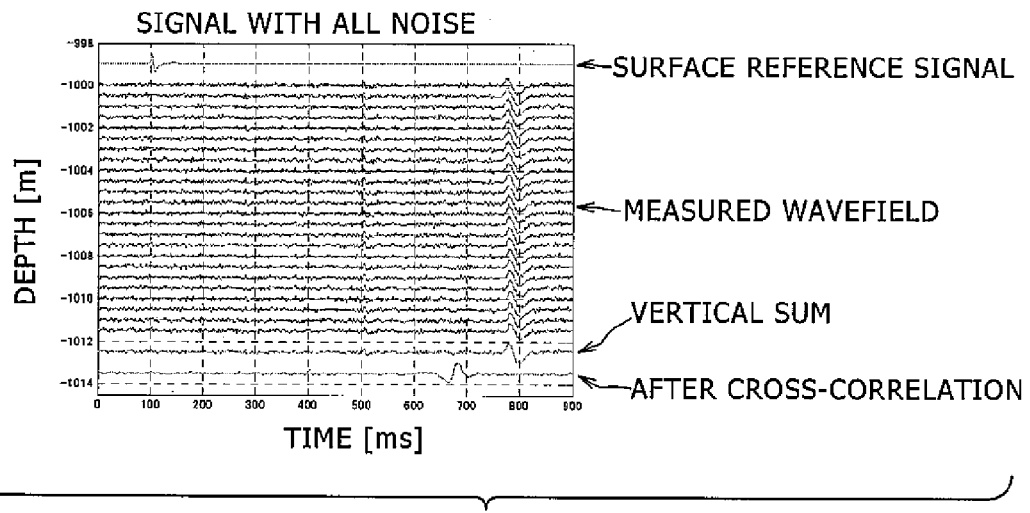

FIG. 2B depicts schematically another exemplary system for moving checkshots having a reference sensor 220 adjacent a seismic signal source 206, such as an air gun, and a sensor section 202 of the tool 203 having a plurality of receiving devices 205, such as hydrophones. In certain aspects, the reference sensor 220 may be buried at the bottom of the pit containing the source 206. The system of FIG. 2B may be utilized for cross-correlation of seismic signals detected by the receiving devices 205 of the sensor section 202. FIG. 2C depicts some possible techniques for noise cancellation including cross-correlation of the detected signals with the reference signals detected by the reference sensor 220. As used herein, noise includes, but is not limited to, coherent noise, such as generated by the moving tool contacting with the borehole wall and propagating along the tool at the speed of sound in the materials used in the tool, and random noise, such as turbulent flow noise.

Coherent noise can not be reduced by stacking because coherent noise propagates in both the upward and downward directions at very fast velocity, such as 5000 meters/sec, and arrives at the receiving devices at almost the same time. Random noise, however, may be reduced by stacking as shown at the bottom of the synthetic data in Plot 3 of FIG. 2C. On the other hand, as also depicted in Plot 2 of FIG. 2C, coherent noise is not reduced by stacking. Coherent noise may be reduced by cross-correlation using a reference sensor such as depicted in FIG. 2B. Such noise reduction techniques are known to persons skilled in the art.

Figure 3A:
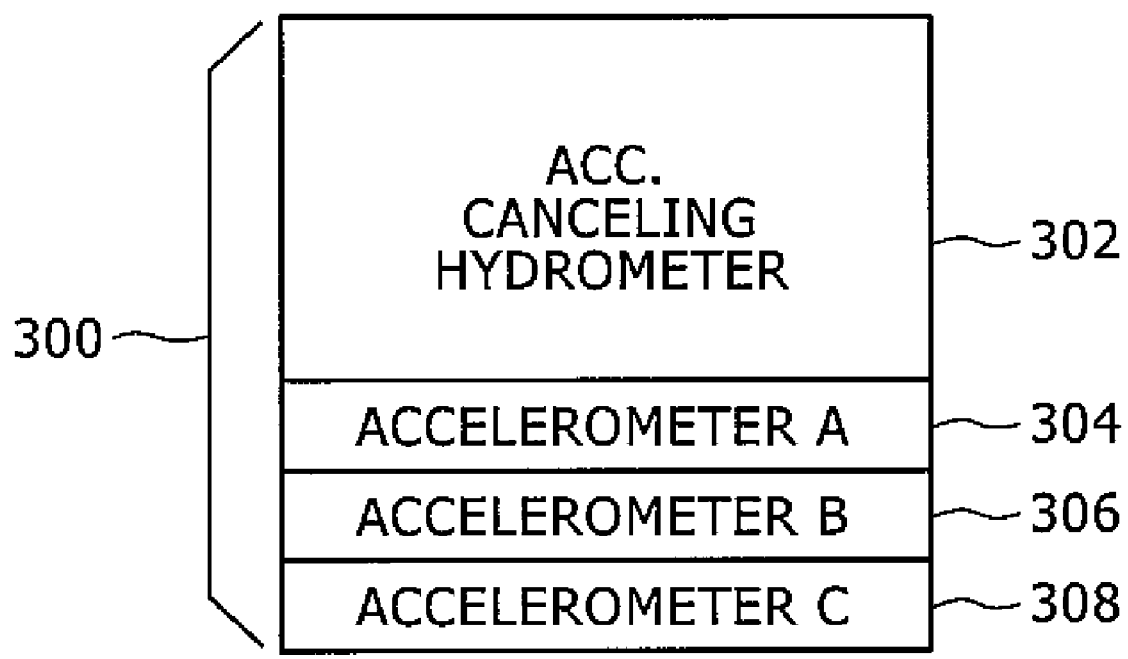
FIG. 3A is a block diagram of one embodiment of a signal sensor section according to the disclosure herein.
Figure 3B:
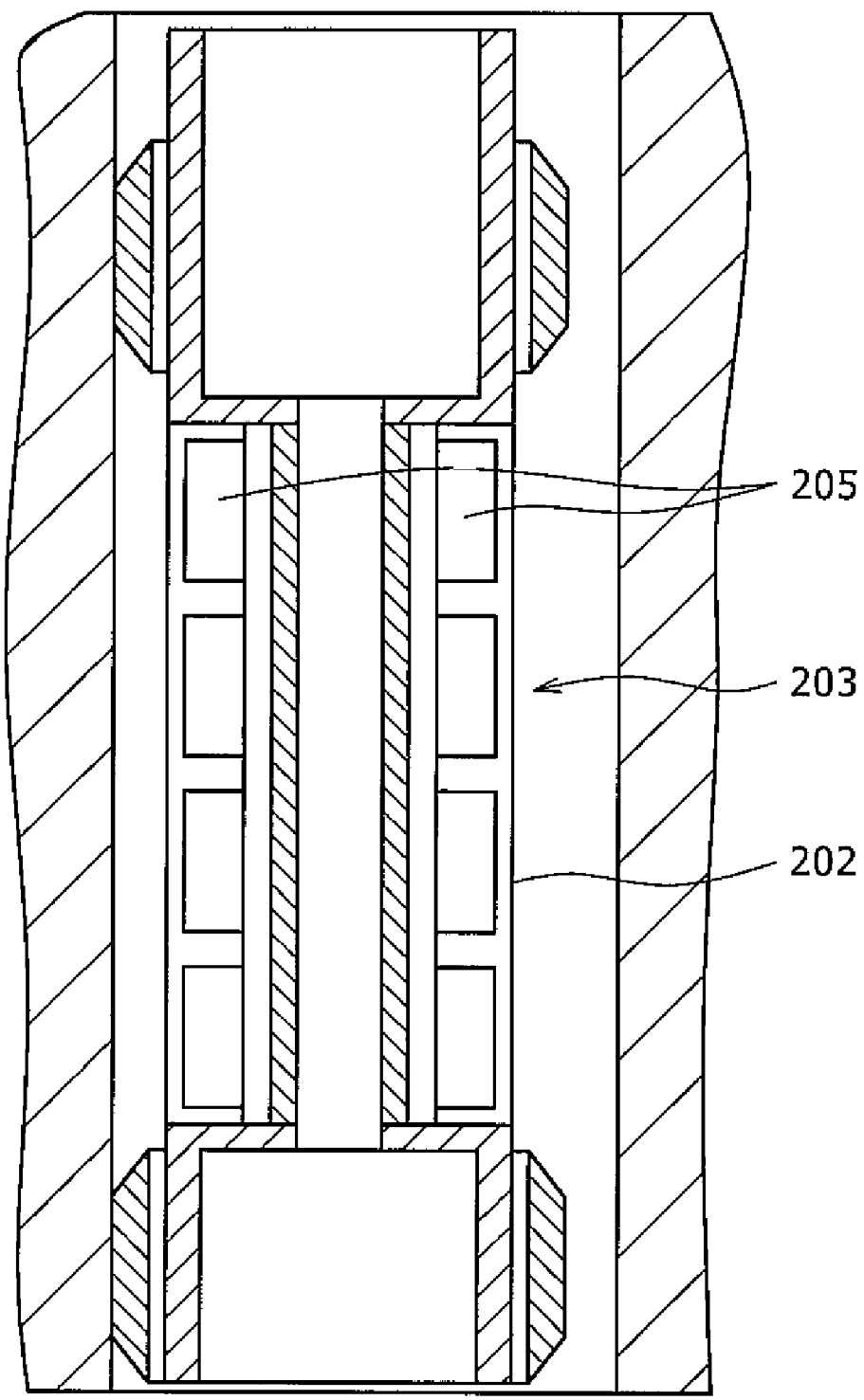
FIG. 3B is a schematic depiction of another embodiment of a signal sensor section according to the disclosure herein.
Figure 3C:
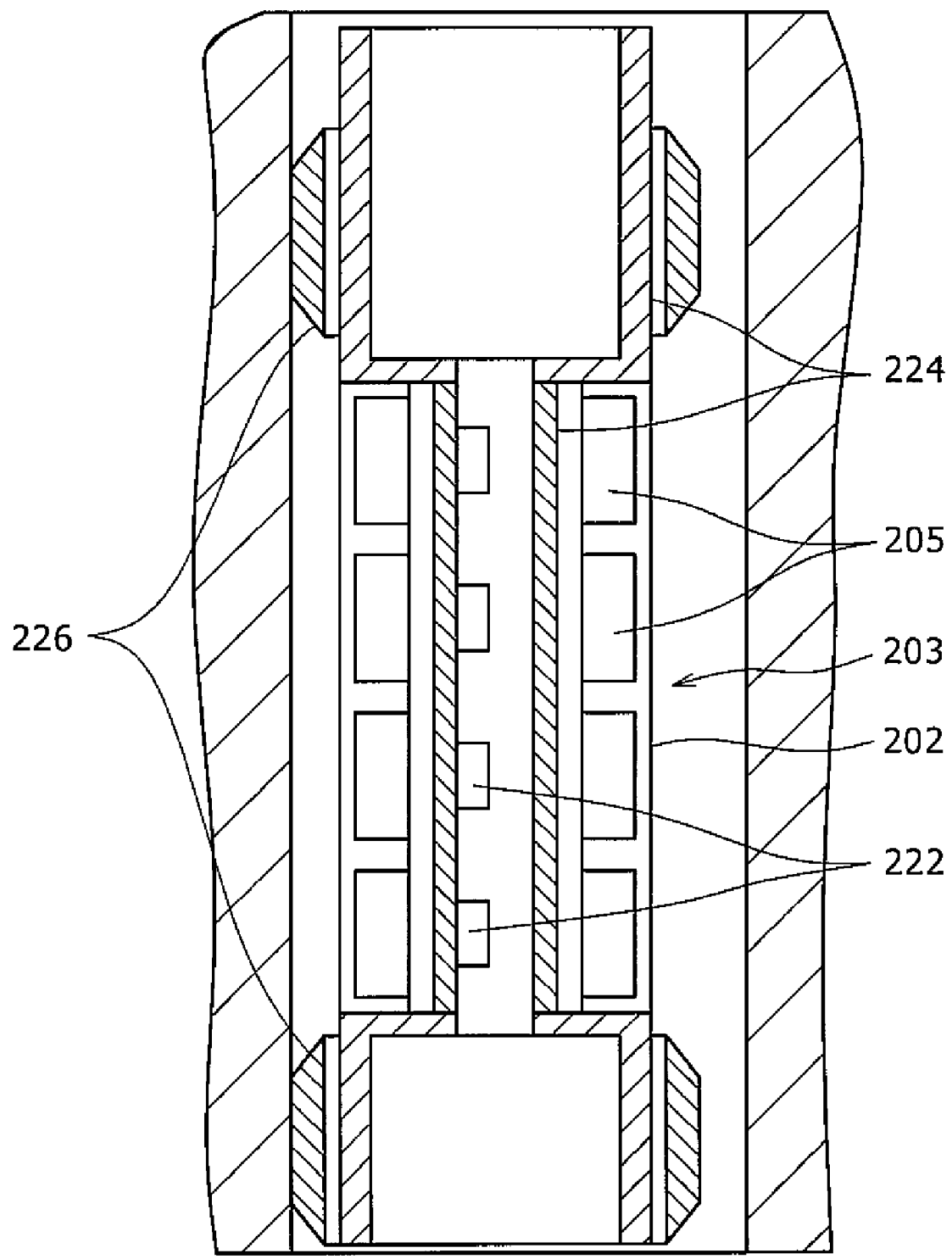
FIG. 3C is a schematic depiction of yet another embodiment of a signal sensor section according to the disclosure herein.

FIGS. 3A to 3C show exemplary seismic signal sensor sections. Turning to FIG. 3A, element 300 corresponds to sensor section 202 of the tool 203 in FIG. 2 that is used for detecting signals and other noise. The device 300 may be divided into sections. For example, section 302 may be one or more acceleration canceling hydrophone. A hydrophone is a device that will detect acoustic signals. This acoustic energy is then converted into an electrical signal that can be monitored. When in motion, noise is introduced to the hydrophone due to the fact that it is moving. Accordingly, acceleration canceling hydrophones are useful in collecting acoustic signal data while in motion. If the hydrophones were used to pick up acoustic energy in a space without obstructions, the acceleration canceling would be adequate, however, the environment downhole is not free of obstacles. It is likely that the tool will contact or collide with the sides of the borehole producing significant noise in comparison to the seismic signals that are of interest. To filter out this noise a plurality of hydrophones and accelerometers and/or geophones may be used, as depicted by elements 304, 306, and 308 in FIG. 3A.

An accelerometer or geophone is a device that measures its own motion and consequently, any changes in that motion. A sudden impact with the wall of the borehole will affect the motion of the accelerometer or geophone and will be measured. This change may be communicated by electrical signals to an analysis unit (for example, at the surface) where adaptive noise cancellation algorithms may be used to filter out the noise from hydrophones and geophones and/or accelerometers, and to provide a clear picture of the seismic signals detected by the acceleration canceling hydrophone 302.

Figure 6A:
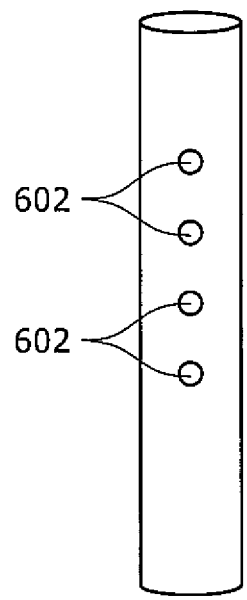
FIG. 6A is a block diagram representation of yet another possible sensor section according to the principles discussed herein.
Figure 6B:
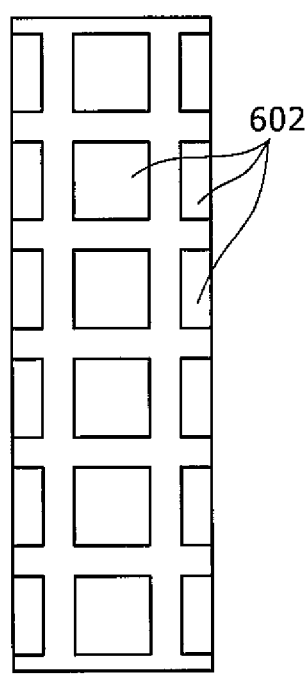
FIG. 6B is yet another embodiment for a sensor section disclosed herein.

In FIG. 3B, another embodiment of a sensor section 202 is depicted having receiving devices 205, such as hydrophones mounted circumferentially in vertically arranged rows on an outer surface of the housing of the sensor section 202 (note also FIG. 6B). FIG. 4A depicts one possible configuration for mounting two hydrophone elements e1 and e2 such that acceleration effects are cancelled. Elements e1 and e2 are identical, but are mounted in opposite directions such that the acceleration responses of the elements cancel. FIG. 4B depicts schematically a configuration that utilizes the acceleration canceling hydrophone arrangement of FIG. 4A for noise cancellation utilizing conventional adaptive noise cancellation algorithms.

Figure 3D:
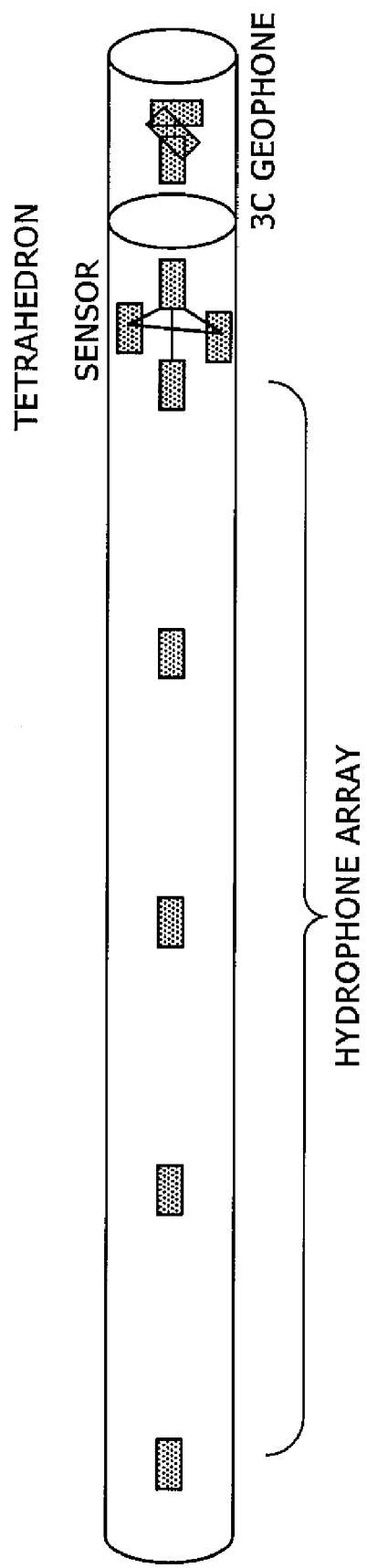
FIG. 3D is a schematic depiction of yet another embodiment of a signal sensor section according to the disclosure herein.

FIG. 3C depicts yet another embodiment of a sensor section 202 having, for example, hydrophones arranged in a manner similar to FIG. 3B, and having one or more accelerometers 222 on an inner side adjacent to the hydrophones 205 for providing noise cancellation. As depicted in FIG. 3C, a sensor section according to the present disclosure may include acoustic isolators 224 for reducing propagation of noise to the hydrophones 205, and stand-offs 226 for preventing or reducing direct contact of the sensor section and associated hydrophones with the borehole wall. FIG. 4C depicts one technique for using accelerometers 222 to reduce noise detected by the hydrophones 205. In this, hydrophones 205 will detect pressure signals due to the seismic source and acceleration noise. On the other hand, accelerometers 222 will detect mostly acceleration and their data may be used, as shown schematically in FIG. 4C, for reducing noise in signals detected by the hydrophones 205. FIG. 3D is a schematic depiction of yet another embodiment of a seismic signal sensor section according to the disclosure herein. As depicted in FIG. 3D, two or more acceleration canceling hydrophones may be configured to detect pressure gradient across the hydrophones. In this, signal processing disclosed herein may include instructions for signal direction estimation based on the pressure gradient detected by the hydrophones. One or more 3-component and/or tetrahedron geophone configurations may be provided, as depicted in one possible arrangement of FIG. 3D, for purposes of signal direction estimation using techniques that are known to those of ordinary skill in the art.

Figure 5:
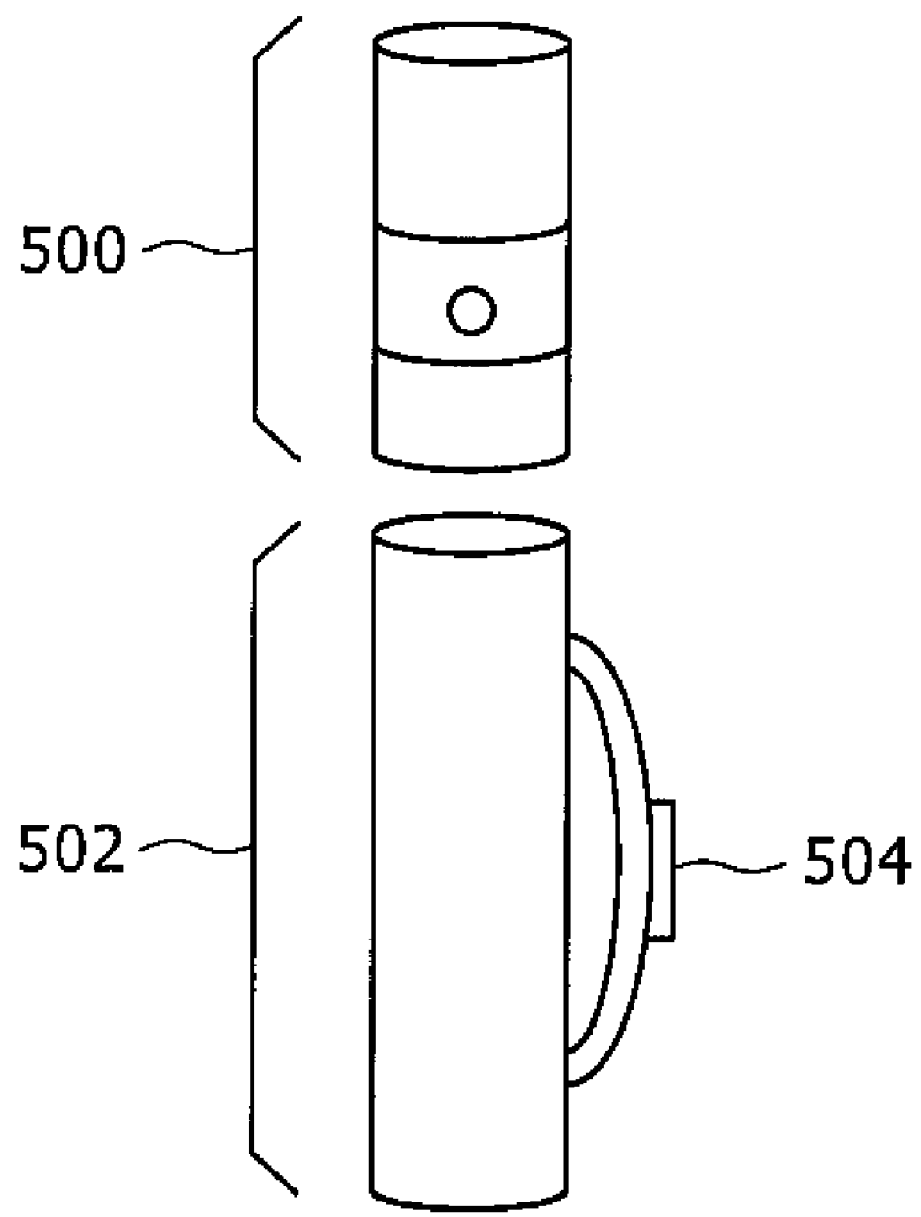
FIG. 5 is a block diagram of a further signal sensor section according to the disclosure herein.

FIG. 5 shows another possible configuration for a sensor section or module according to the principles described herein. Section 500 is one example of a tool module with a sensor section 202 such as illustrated in FIG. 2A and described above. Element 502 may be an optional add-on to the system comprising a plurality of hydrophones and geophones and a stabilizing member or stand-off 504. The receivers may be used in creating a velocity profile in a horizontal well. However, in this case, the tool must be stopped and stabilized for taking the measurements due to noise sensitivity of the geophones.

The noise environment downhole creates an undesirable signal to noise ratio, and tool design combined with signal processing for noise cancellation is the key to creating an accurate velocity profile. In addition to noise produced by acceleration (actual motion and impact), acoustic noise is also expected from tubewaves and turbulent flows around the tool. The first approach is mechanical, essentially designing structures around the tool to decrease impacts and turbulence. This may include a stand-off or a contouring of the tool itself to minimize jarring on impact. Aside from these mechanical solutions, another approach is to construct a sensor section with an array of acceleration canceling receivers (note, for example, FIG. 3B) to sample the noise sufficiently densely that it is coherent, but with a different apparent velocity to the required signals. It is expected that acoustic noise will be constant along the length of the monitoring device.

In certain aspects disclosed herein, the tool may be stopped during a logging run so that signals from the seismic source are received while the tool is stationary. Such seismic data that is acquired while the tool is stationary may be used for signal processing to remove noise that is received with seismic data that is recorded while the tool is moving.

FIG. 6A shows another aspect of a sensor section module according to the principles described herein where, for example, four hydrophones labeled 602 are spaced approximately 1.5 ft apart. The aforementioned spacing is one example of a spacing that is sufficient to properly sample the tubewave noise, although other orientations may also be used. In this, possible distances between adjacent receivers range from about 3 ft to about 5 inches apart. The data from the array of hydrophones are used in an adaptive noise cancellation algorithm (note FIG. 4C) to filter out the noise and retain only the signal of interest.

FIG. 6B shows yet another possible configuration of a sensor section module such as depicted in FIG. 6A. In this, since it is difficult to fabricate large piezo-ceramic elements, a plurality of piezo-ceramic elements may be arranged circumferentially on an outer surface of the housing or casing of the sensor section so as to configure, for example, a large sized cylindrical hydrophone, as depicted in FIG. 6B. The circumferentially arranged elements may be extended in vertical directions. However, if the overall height of the sensor section is large, it may be necessary to digitize signals individually to detect moveout of the seismic wavefield (note FIG. 8A). For example, 1 meter vertical separation causes about ½ millisec moveout.

Figure 7:
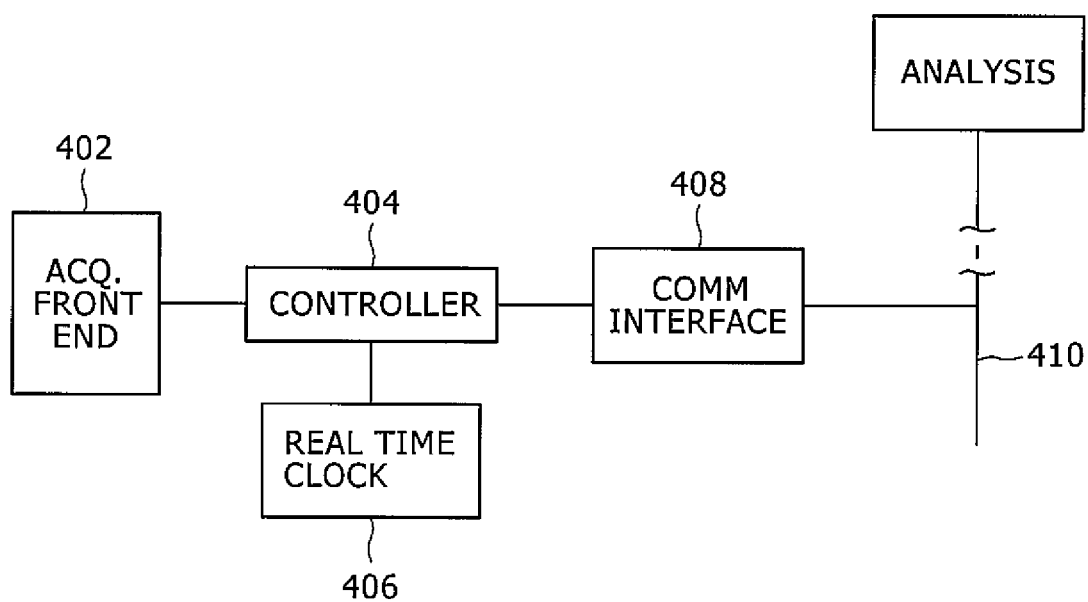
FIG. 7 is a schematic representation of one embodiment of an exemplary system for moving checkshots according to the principles described herein.

FIG. 7 shows one example of a moving checkshots system having a modular sensor section according to the principles discussed herein. The acquisition front end 402 may contain the sensor section elements described above, as well as their associated connections and electronics. For example, the acquisition section 402 may include electronics suitable for the relevant or desired frequencies that are to be received by the receiving device. In this, electronics for signal conditioning and digitization may be included as known to those of skill in the art. The overall operation of the system is coordinated by controller 404. The controller is capable of adjusting the acquisition parameters for section 402 and timing the start and end of acquisition, among its other functions. A real time clock 406 may be used to provide the time to the controller for the determination of when a signal is received and for timing the appropriate collection intervals. This clock's time is used in concert with the time that the seismic signal is generated on the surface so that the travel time can be determined. Information from the controller may be sent to an analysis unit 412. In one embodiment, an analysis unit may be located at the surface of the borehole in platform 214 (note FIG. 2A). Communications interface 408 may be used to convey the signals output from the controller 404 to communication cable 410, and subsequently to analysis unit 412. The analysis unit may perform adaptive noise cancellation as well as determination of the signal velocity for each data collection. As previously mentioned, the functions of the analysis unit may be distributed between modules at the surface and downhole, as desirable or necessary for the operations described herein.

The controller 404 and the surface analysis unit 412 are configured to measure the depth of the sensor section at any time. One method of accomplishing this is to measure the amount of conveyance that is output by the winch 210 (note FIG. 2A). Knowing this depth, the seismic source 206 can be activated with the receivers at a variety of depths. This allows the system to ensure that measurements are taken at specific depths and a complete velocity profile can be calculated even if the rig motion is temporarily stopped with the tool downhole.

Figure 8A:
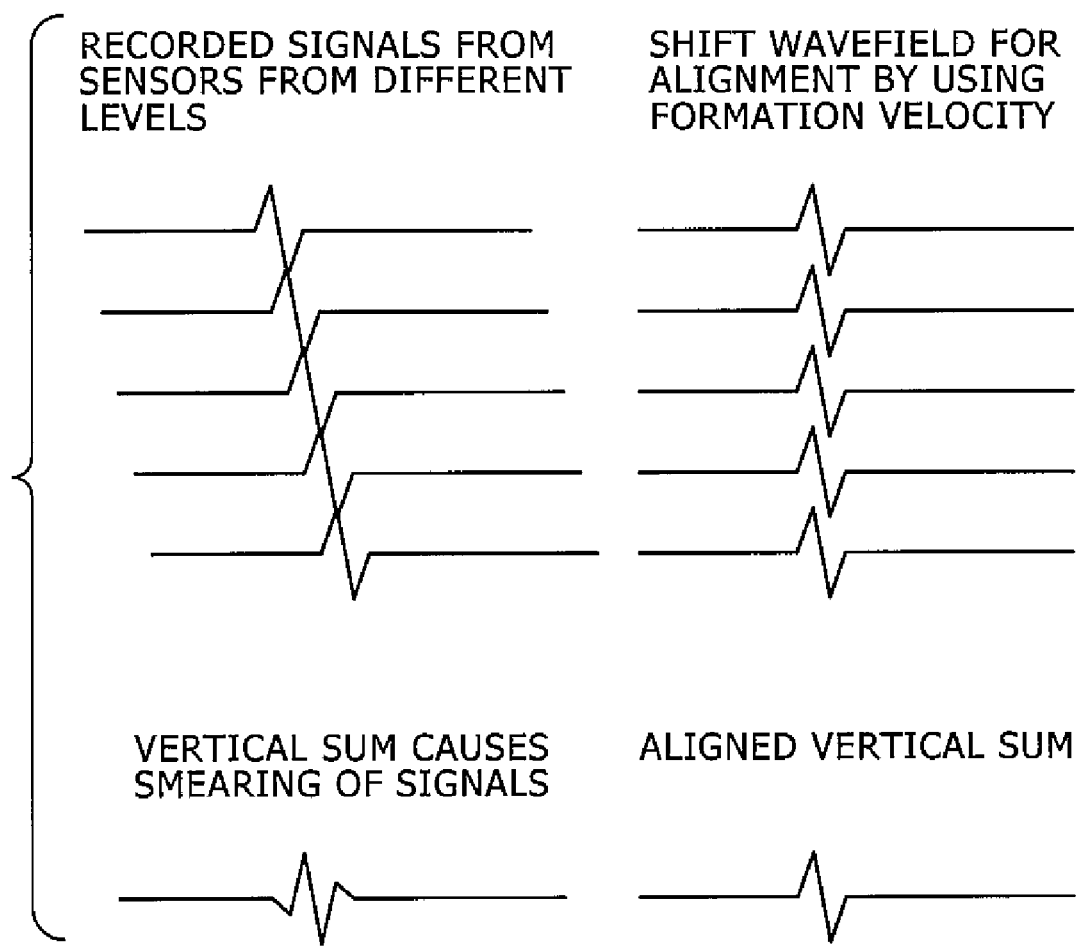
FIGS. 8A and 8B depict exemplary techniques for shift and sum processing as described herein.
Figure 8B:
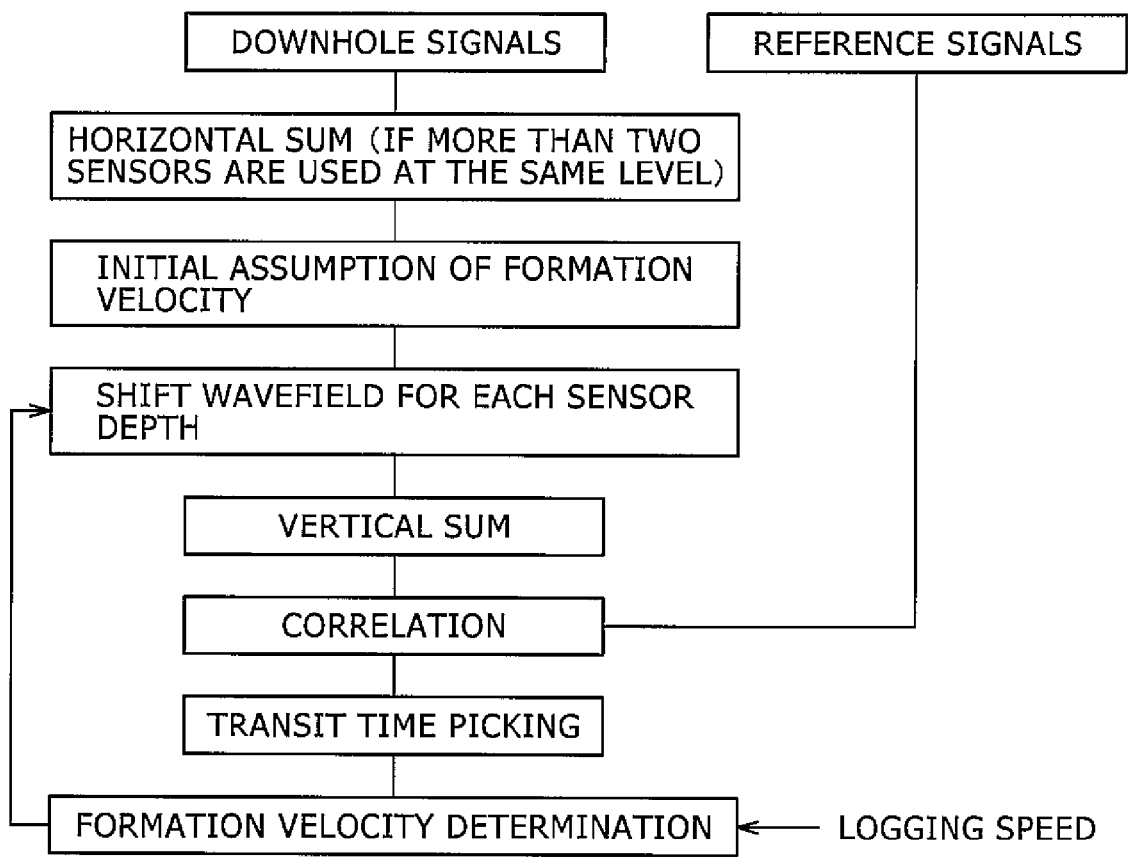
Figure 9:
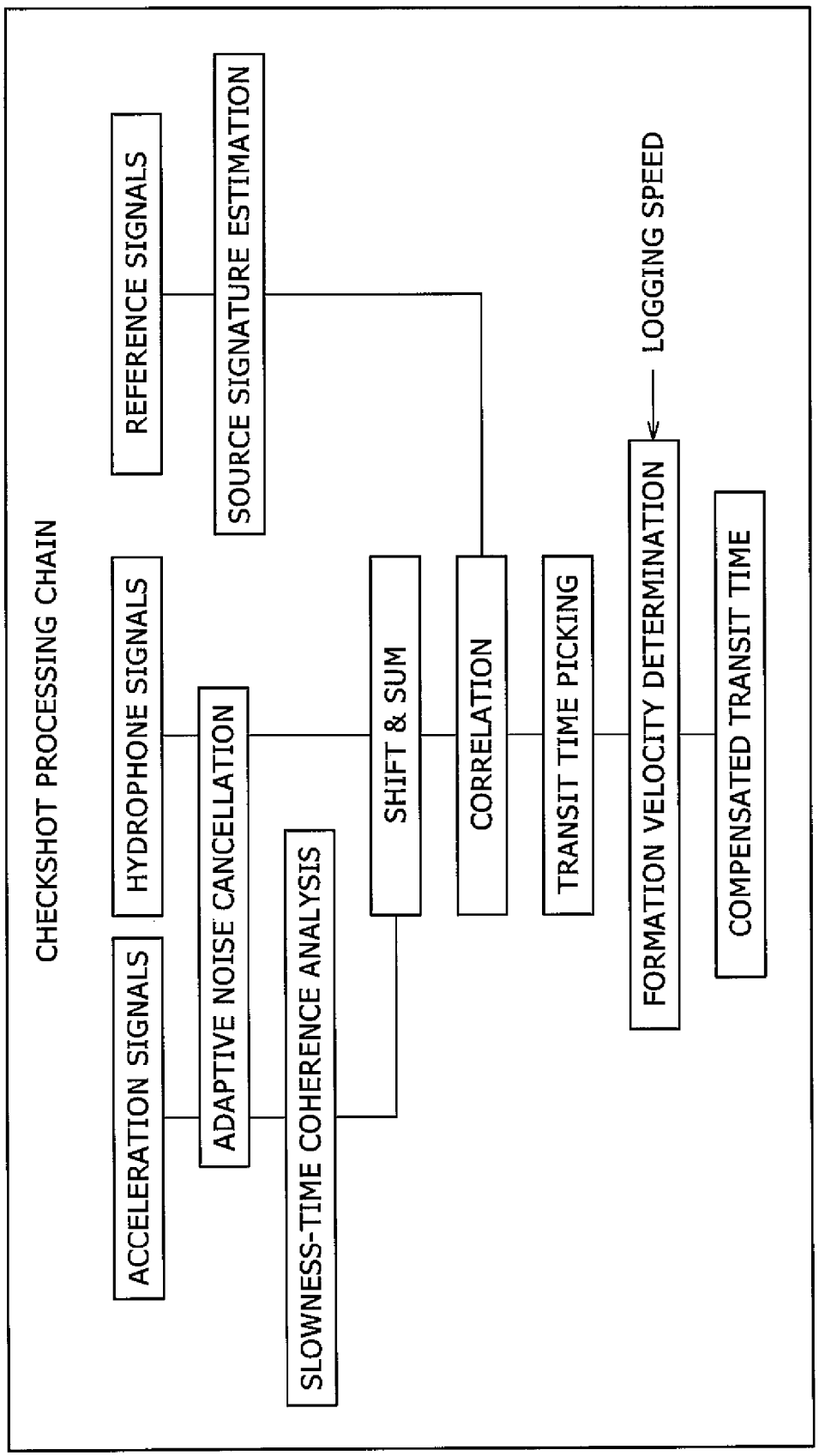
FIG. 9 depicts one exemplary checkshot processing technique.

FIGS. 8A and 8B depict exemplary techniques for shift and sum processing to avoid smearing of signals that are detected by receivers at different levels. FIG. 9 depicts one exemplary checkshot processing technique utilizing slowness-time coherence analysis with the moving checkshot systems previously described herein. Data from hydrophones, accelerometers, reference sensors may be processed in, for example, a suitably configured processor having instructions for adaptive noise cancellation algorithm, shift/summing, cross-correlation, STC analysis, among others, as schematically depicted in FIG. 9. In consequence, formation velocity may be determined and compensated transit time derived from the processing chain.

Figure 10A:
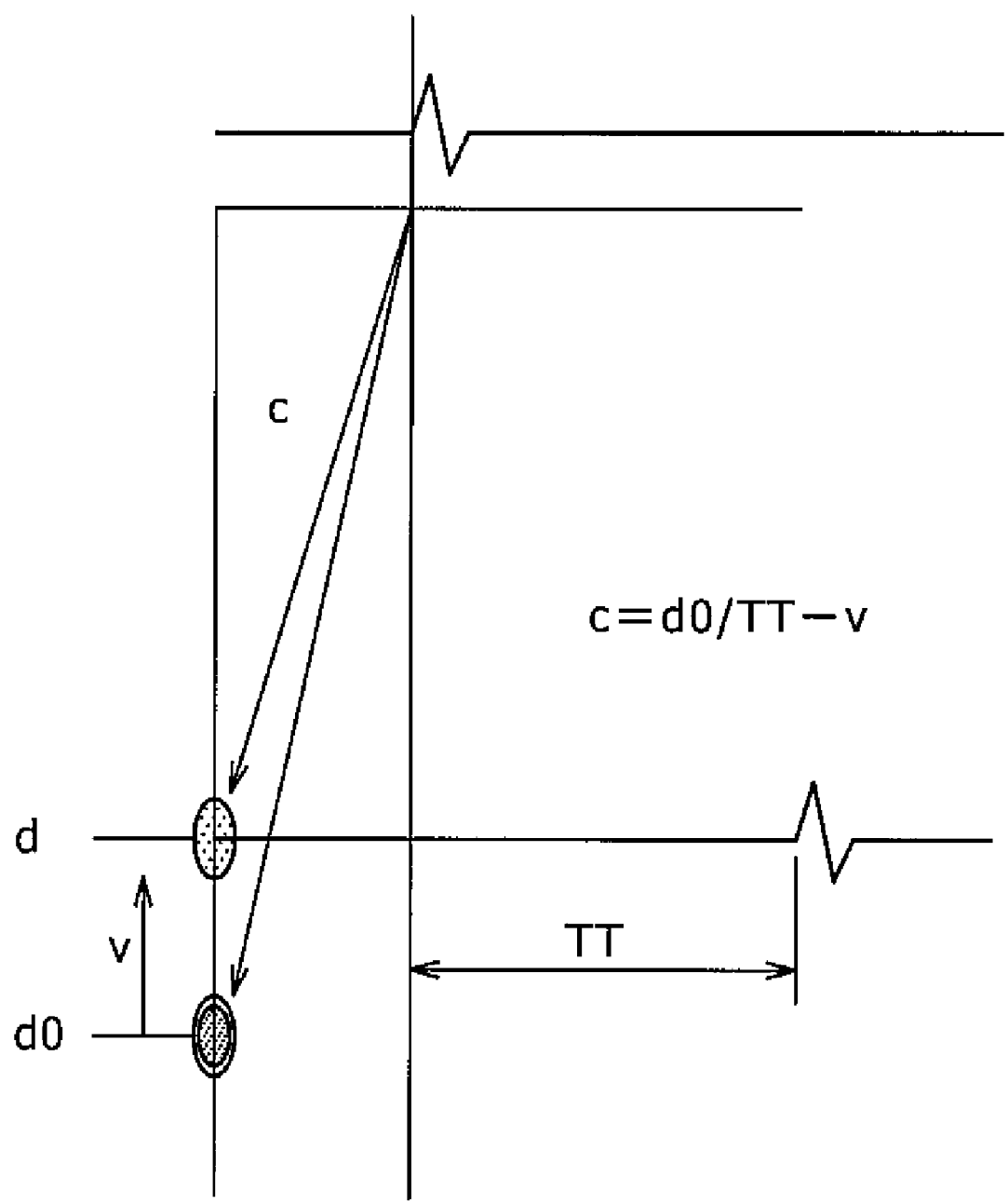
Figure 11A:
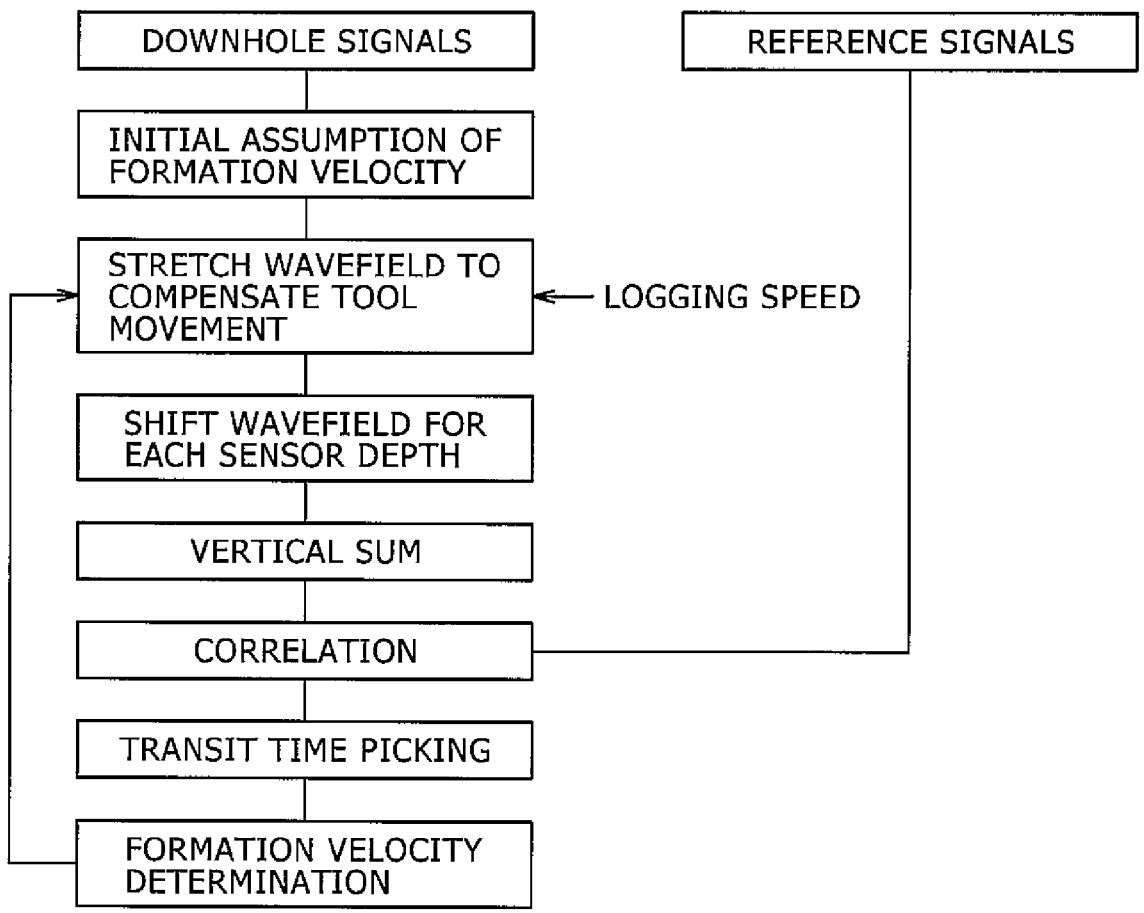
FIGS. 11A and 11B depict two exemplary techniques for compensating for tool movement according to the description herein.
Figure 11B:
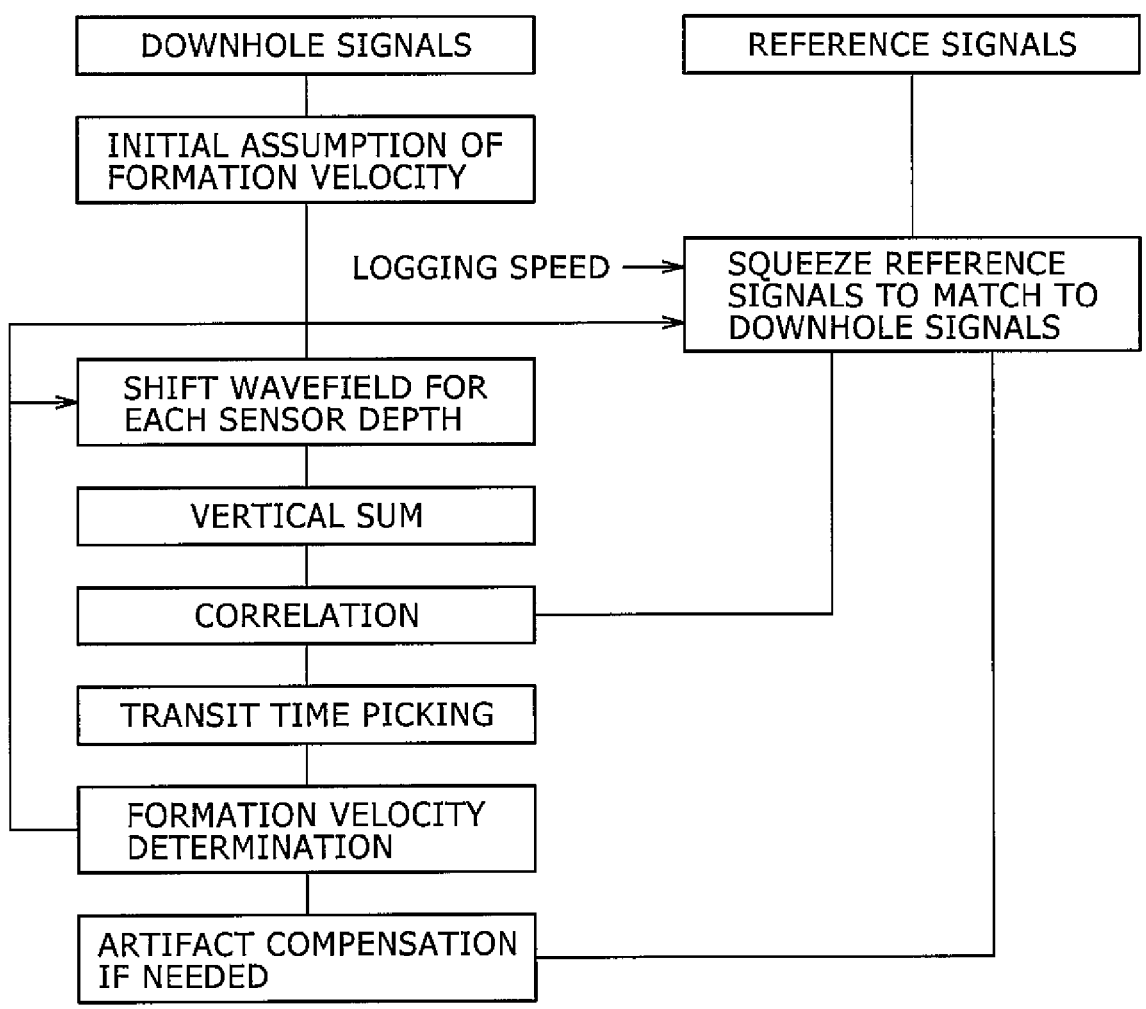

FIGS. 10A and 10B are schematic depictions of the Doppler effect for moving checkshots. In FIG. 10A, when utilizing an impulsive source such as an air gun, the gun is fired when the downhole checkshot tool is at d0. The tool moves at a logging speed of v. When the tool receives the signals, the tool is at a depth of d. The difference between gun firing time and signal detection time is the transit time (TT) at depth d, where d=v*TT. If the averaged velocity of sound in the formation is c, then the formation velocity c between the surface and depth d is c=d0/TT−v. In FIG. 10B, when utilizing a vibrator, the downhole checkshot tool starts receiving the sweep signal at TT after starting of the sweep at ground surface. The tool keeps moving up and finishes receiving the sweep at depth, de. It is seen that the sweep length recorded by a moving tool is shorter than the original sweep length by DT (=(ds−de)/c). FIGS. 11A and 11B depict exemplary techniques for compensating for the aforementioned tool movements, depicted in FIGS. 10A and 10B.

Figure 12:
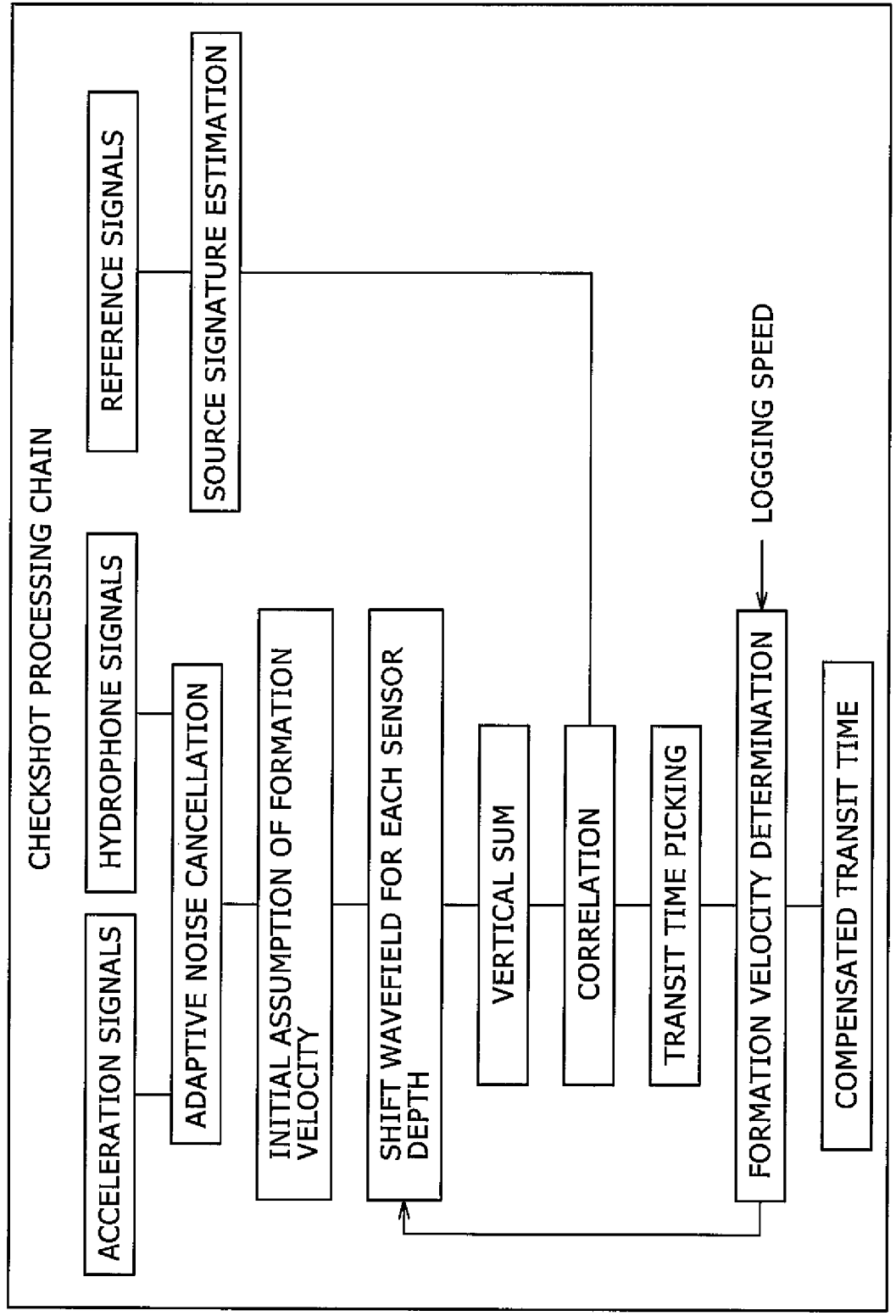
FIG. 12 depicts another exemplary technique for checkshot processing.

FIG. 12 depicts another exemplary technique for checkshot processing. In this, if signals from an accelerometer are available to monitor noise propagating in the tool, noise present in the signals detected by the hydrophones may be reduced by adaptive noise cancellation algorithms.

Figure 13:
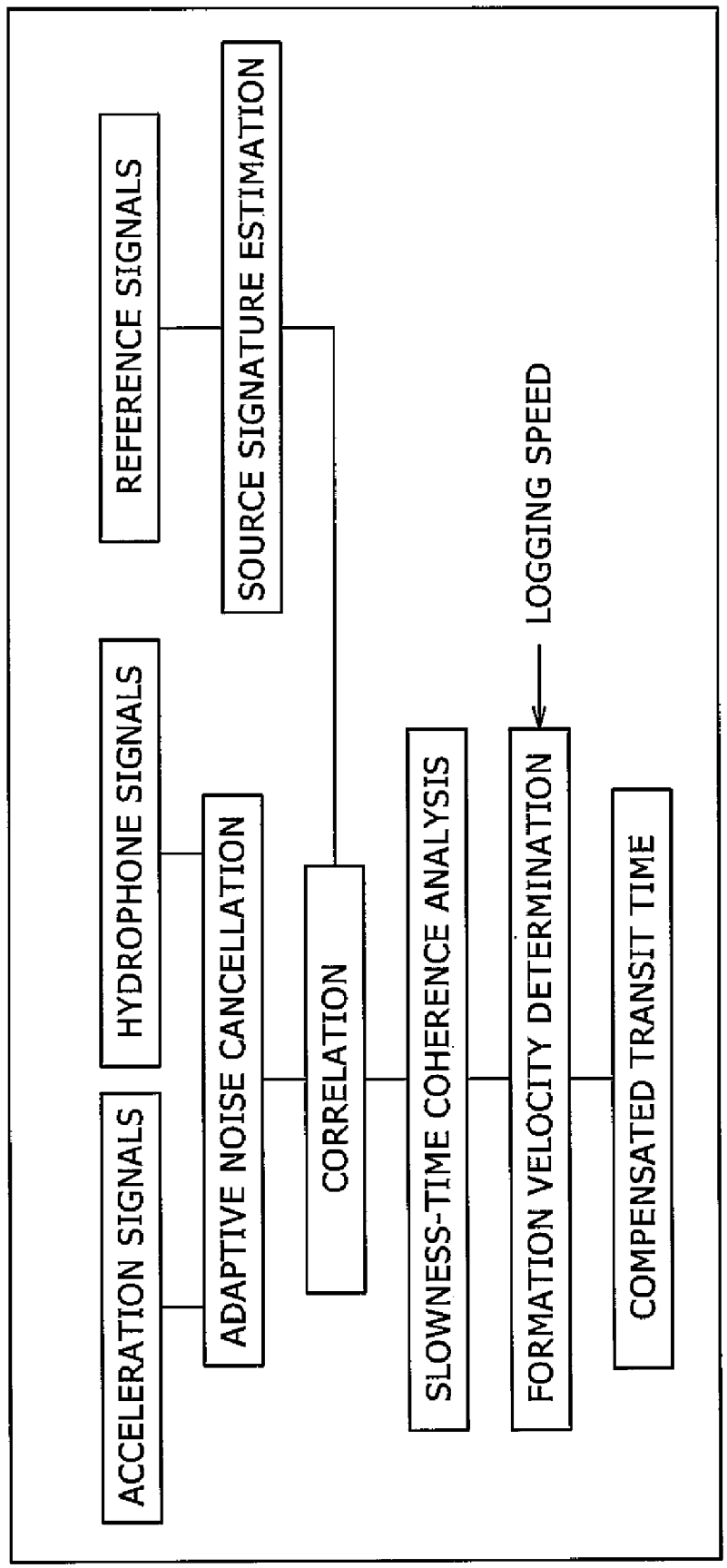
FIG. 13 depicts one exemplary technique for correlation of individual traces.

FIG. 13 depicts one exemplary technique for correlation of individual traces.

Figure 14A:
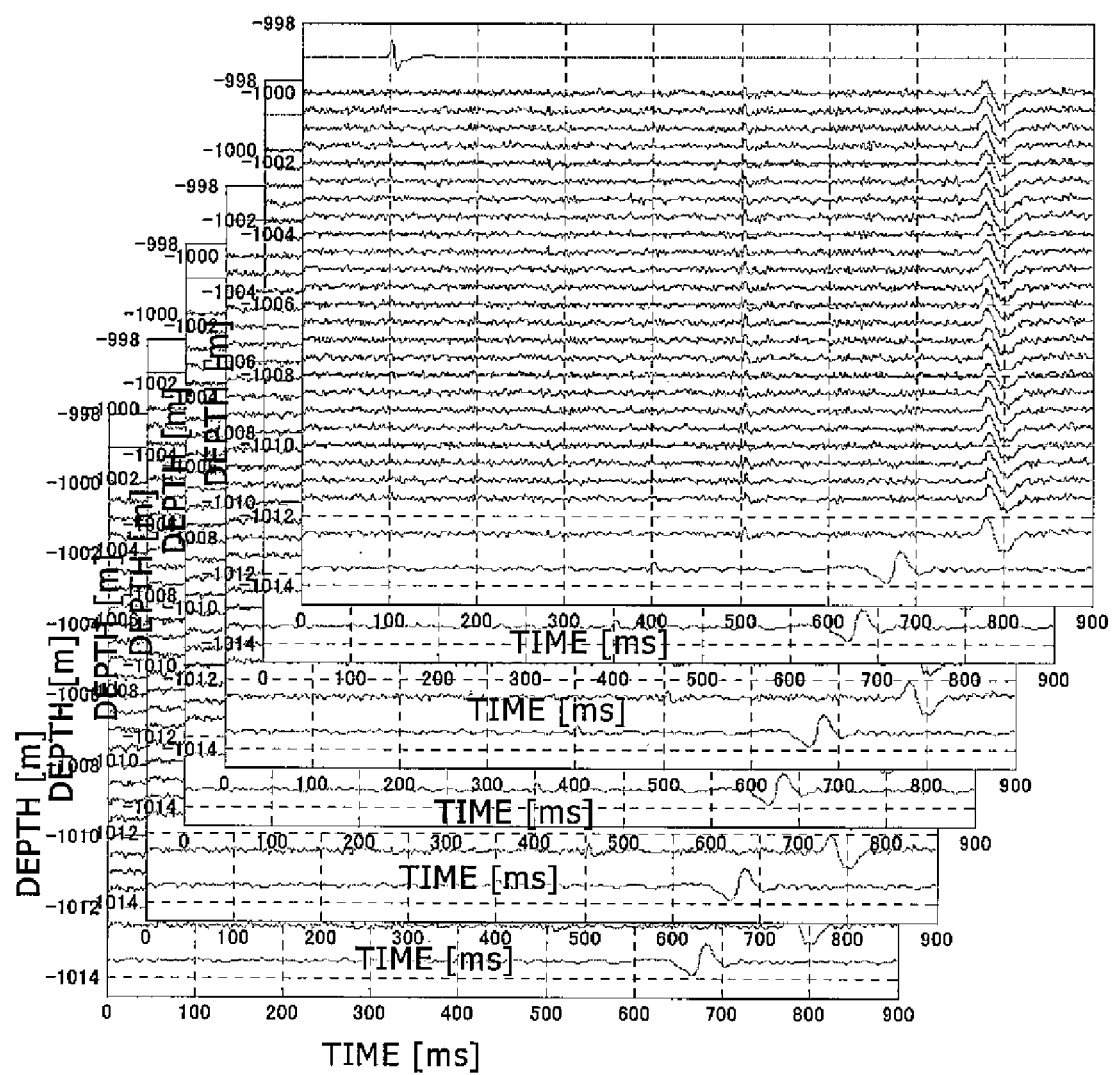

FIGS. 14A and 14B depict exemplary techniques for continuous moving checkshots. Assuming a logging speed of 1 meter/sec, with receivers located every 0.25 meter for 24 levels so that the sensor section length is 6 meters, by firing the source every second it is possible to capture seismic signals at duplicated depths. Then the detected signals can be stacked at similar levels and the top level depicted in FIG. 14A can be repeated 6 times. In high noise environments, where locally generated noise is seen to be coherent across the receiver array, several levels may be summed, for example, records recorded over a distance of 10 meters, to enhance the noise cancellation and improve source signal levels. FIG. 14B depicts one checkshot processing technique for the levels in FIG. 14A. Assuming the formation velocity, many shots at different tool depths can be shifted and summed according to sensor depth to improve signal-to-noise ratio. In one aspect, the entire data in a logging run can be analyzed for precise checkshots after completion of the logging run.

Figure 15:
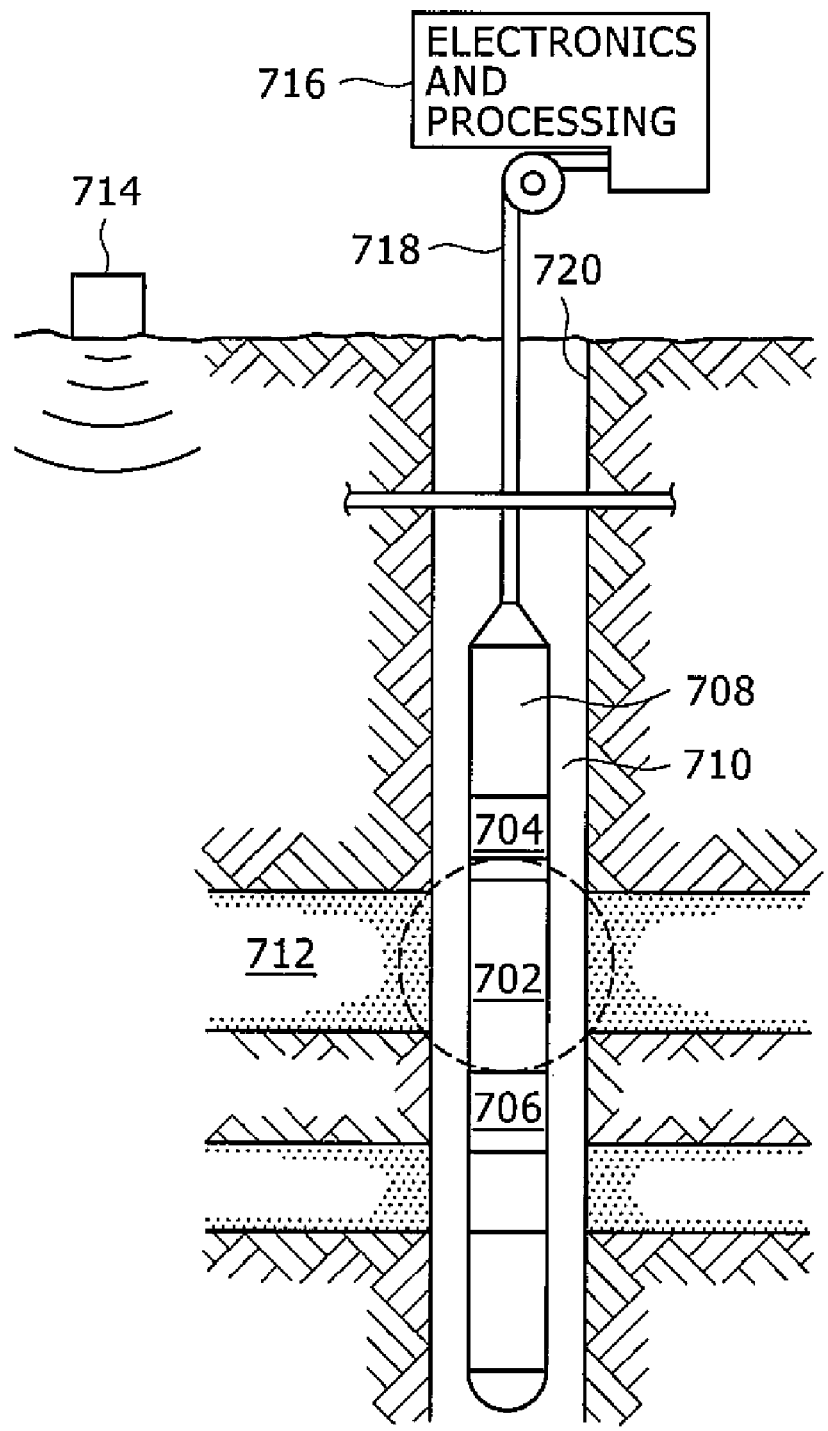
FIG. 15 is a schematic representation of one embodiment of an exemplary system for moving checkshots with an integrated tool according to the principles described herein.

FIG. 15 is a schematic representation of one embodiment of an exemplary system for moving checkshots with an integrated tool according to the principles described herein. The described functions and methods allow for the production of a nearly continuous log of one-way transit times for the seismic energy traveling through the formation. In consequence, a much higher resolution velocity model can be obtained in comparison with when the seismic tool is forced to stop and brace the monitoring device each time a measurement is desired. The model that is derived is very much like a sonic log, but at seismic frequencies. Seismic velocities may be more desirable for surface seismic and microseismic processing, and are generally free from near wellbore effects that can bias sonic logs.

One aspect of the device described herein is a combinable cartridge (note FIG. 15), so that two or more 702, 704, 706 may be used simultaneously in the same toolstring 708. Correlation between signals from two spaced hydrophones (or cartridges) can reduce noise even further and directly provide an incremental seismic travel time—like sonic DT—and local seismic velocity directly in log form. Incremental transit times may be summed and/or combined with high quality (absolute) checkshots to form a composite time-depth log. The depth triggered activation described above enables this feature.

Due to its ability to collect data while in motion, a tool as described herein may be integrated with a number of other tools, for example, Schlumberger's proprietary tools Platform Express and Pressure Express. As depicted in FIG. 16, the combination tools may be connected rigidly, or multiple tools may be connected using cable. Moreover, a tool module according to the principles herein may be integrated with another tool having downhole fluid analysis capability. Consequently, in certain circumstances conventional requirements of a separate seismic run may be avoided with an associated saving in time and money. Furthermore, since conventional checkshot measurements are typically conducted later in the life of a well, by the principles herein early checkshot measurements may be achieved with attendant benefits in having the information at an earlier stage in well development. However, because of the high level of sensitivity of the electronics, a monitoring device and associated electronics as described herein when operated with other tools require some modifications. For example, the clock 406 may be configured with the controller 404 (note FIG. 7) to ensure that the acquisition front end 402 does not receive signals at any time when other integrated tools are sending signals into the formation or formation fluids that could create an error in the checkshot measurements.

The preceding description has been presented only to illustrate and describe certain embodiments and aspects. It is not intended to be exhaustive or to limit the invention to any precise form disclosed. Many modifications and variations are possible in light of the above teaching.

The embodiments and aspects were chosen and described in order to best explain the principles of the invention and its practical applications. The preceding description is intended to enable others skilled in the art to best utilize the principles described herein in various embodiments and with various modifications as are suited to the particular use contemplated. It is intended that the scope of the invention be defined by the following claims.

What is claimed is:

1. A system configured for acquiring checkshot data while moving a tool in a borehole, comprising:
   a source configured at a location separated away from the tool for generating signals;
   a conveyance and a sensor section configured for movement of the sensor section in a borehole;
   the sensor section comprising: at least one receiver configured to detect signals, generated by the source, while the sensor section is moving in the borehole; and
   a controller operatively coupled to the receiver and the source, wherein the controller adjusts the detected signals due to the movement of the receiver from the time the source was actuated to the time the signal was received by the receiver.

2. The system of claim 1, wherein the sensor section is configured for detecting seismic signals.

3. The system of claim 1, wherein the sensor section is configured for detecting at least some signals other than seismic signals.

4. The system of claim 1, wherein the at least one receiver comprises one or more hydrophone.

5. The system of claim 4, wherein the one or more hydrophone comprises one or more acceleration canceling hydrophone.

6. The system of claim 4, further comprising: a plurality of accelerometers and/or geophones configured to detect noise during the movement of the sensor section.

7. The system of claim 1, further comprising: a reference sensor associated with the source and configured for acquiring a reference signal generated by the source, the system being further configured for cross-correlation of the signals detected by the at least one receiver, based on the reference signal, to reduce noise generated by movement of the sensor section in the borehole.

8. The system of claim 1, wherein the at least one receiver comprises a plurality of hydrophones arranged circumferentially in at least one row on an outer surface of a housing of the sensor section, the system being further configured for random noise reduction based on seismic signals detected by the plurality of hydrophones.

9. The system of claim 8, further comprising a processor configured for random noise reduction, wherein the processor comprises instructions for segmenting and digitizing separately the seismic signals detected by the plurality of hydrophones, and shift/summing the seismic signals.

10. The system of claim 8, further comprising one or more accelerometers, wherein at least one accelerometer is located adjacent an inner side of the circumferentially arranged hydrophones on the housing of the sensor section.

11. The system of claim 1, further comprising a processor configured for noise reduction, wherein the processor comprises instructions for compensating the signals detected by the at least one receiver for tool movement.

12. The system of claim 11, wherein the processor instructions comprise instructions for correction for a Doppler effect.

13. The system of claim 11, wherein the source comprises an impulsive source.

14. The system of claim 11, wherein the source comprises a vibrator.

15. The system of claim 1, wherein the system is configured for continuous checkshot data acquisition and processing.

16. The system of claim 1, further comprising:
   a controller section operably connected to the sensor section and configured to adjust data acquisition parameters;
   a clock operably connected to the controller section;
   a communications interface operably connected to the controller and the conveyance and configured to communicate data along the conveyance;

a surface processing unit operably connected to the conveyance, wherein the at least one receiver is configured to transmit electrical signals through the controller section, the communications interface, and the conveyance to the surface processing unit, and the surface processing unit is configured to perform signal processing and to generate a velocity profile using the electrical signals from the at least one receiver.

17. The system of claim 1, wherein the conveyance is configured to move the sensor section through the borehole at a constant rate.

18. The system of claim 1, wherein the at least one receiver is configured to detect signals generated by the source at ground level.

19. The system of claim 1, wherein the at least one receiver is configured to detect signals generated by the source below ground level.

20. The system of claim 1, wherein the source comprises one or more of an air gun, an electromagnetic transmitter, a dropped weight, and a vibrator.

21. The system of claim 1, wherein the conveyance is configured to temporarily stop the sensor section during movement through the borehole;
the sensor section is configured to detect signals while stopped in the borehole; and
the system further comprising a processor having instructions for noise removal based on the detected signals while stopped.

22. The system of claim 1, further comprising:
two or more acceleration canceling hydrophones configured to detect pressure gradient across the hydrophones;
a processor comprising instructions for signal direction estimation based on the pressure gradient detected by the hydrophones.

23. The system of claim 1, further comprising:
one or more 3-component geophone and/or tetrahedron geophone;
a processor comprising instructions for signal direction estimation based on signals detected by the one or more 3-component geophone and/or tetrahedron geophone.

24. The system of claim 1, further comprising a processor comprising instructions for signal processing.

25. The system of claim 24, wherein the signal processing instructions comprise adaptive noise cancellation algorithm.

26. The system of claim 1, further comprising:
a stabilizing structure configured for reducing shock from contact between the sensor section and the borehole wall.

27. The system of claim 1, further comprising:
one or more acoustic isolators located adjacent to the at least one receiver and configured to reduce propagation of noise to the receiver.

28. The system of claim 1, wherein the sensor section is contoured to reduce shock from contact with the borehole wall.

29. The system of claim 1, further comprising a controller configured to control the at least one receiver to detect data only when other devices are not transmitting interfering noise.

30. The system of claim 1, further comprising a controller configured to synchronize firing of the source and signal detection of the at least one receiver.

31. The system of claim 1, further comprising a controller configured to control firing of the source based on the location in the borehole of the sensor section.

32. The system of claim 31, wherein the controller is further configured to control the source such that signals are generated at intervals of depth of the sensor section.

33. The system of claim 32, wherein the controller is further configured to control the source such that signals are generated at 10 feet intervals while the sensor section moves through the borehole.

34. An apparatus for acquiring checkshot data while moving a tool in a borehole, comprising:
a sensor section configured for movement in a borehole;
the sensor section comprising:
at least one receiver configured to detect signals while the sensor section is moving in the borehole; and
a controller operatively coupled to the receiver and a source, wherein the controller adjusts the detected signals due to the movement of the receiver from the time the source was actuated to the time the signal was received by the receiver.

35. The apparatus of claim 34, wherein the at least one receiver comprises one or more hydrophone.

36. The apparatus of claim 35, wherein the one or more hydrophone comprises one or more acceleration canceling hydrophone.

37. The apparatus of claim 35, further comprising:
a plurality of accelerometers and/or geophones configured to detect noise during the movement of the sensor section.

38. The apparatus of claim 34, wherein the at least one receiver comprises a plurality of hydrophones arranged circumferentially in at least one row on an outer surface of a housing of the sensor section.

39. The apparatus of claim 38, further comprising one or more accelerometers, wherein at least one accelerometer is located adjacent an inner side of the circumferentially arranged hydrophones on the housing of the sensor section.

40. The apparatus of claim 34, being further configured for continuous checkshot data acquisition and processing.

41. The apparatus of claim 34, further comprising:
a controller section operably connected to the sensor section and configured to adjust data acquisition parameters;
a clock operably connected to the controller section;
a communications interface operably connected to the controller and configured to communicate data along a conveyance, wherein the at least one receiver is configured to transmit electrical signals through the controller section and the communications interface to the surface.

42. The apparatus of claim 34, wherein the at least one receiver is configured to detect seismic signals generated by a source at or below ground level.

43. The apparatus of claim 34, further comprising:
two or more acceleration canceling hydrophones configured to detect pressure gradient across the hydrophones.

44. The apparatus of claim 34, further comprising:
one or more 3-component geophone and/or tetrahedron geophone.

45. The apparatus of claim 34, further comprising:
a stabilizing structure configured for reducing shock from contact between the sensor section and the borehole wall.

46. The apparatus of claim 34, further comprising:
one or more acoustic isolators located adjacent to the at least one receiver and configured to reduce propagation of noise to the receiver.

47. The apparatus of claim 34, wherein the sensor section is contoured to reduce shock from contact with the borehole wall.

48. The apparatus of claim 34, further comprising a controller configured to control the at least one receiver to detect data only when other devices are not transmitting interfering noise.

49. The apparatus of claim 34, further comprising a controller configured to synchronize seismic signal detection of the at least one receiver.

50. A method for acquiring checkshot data while moving a tool in a borehole, comprising:

configuring a source at a location away from the tool for generating signals;

deploying a conveyance and a sensor section configured for movement of the sensor section in a borehole;

detecting signals, generated by the source, with at least one receiver; and continually moving the sensor section along the length of the borehole at a constant speed.

* * * * *